(12) United States Patent
Shanbhogue et al.

(10) Patent No.: US 11,656,873 B2
(45) Date of Patent: May 23, 2023

(54) SHADOW STACK ISA EXTENSIONS TO SUPPORT FAST RETURN AND EVENT DELIVERY (FRED) ARCHITECTURE

(71) Applicant: Intel Corporation, Santa Clara, CA (US)

(72) Inventors: Vedvyas Shanbhogue, Austin, TX (US); Gilbert Neiger, Portland, OR (US); Deepak K. Gupta, Portland, OR (US); H. Peter Anvin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/590,648

(22) Filed: Feb. 1, 2022

(65) Prior Publication Data
US 2022/0171625 A1    Jun. 2, 2022

Related U.S. Application Data

(63) Continuation of application No. 16/833,599, filed on Mar. 28, 2020, now Pat. No. 11,243,769.

(51) Int. Cl.
*G06F 9/30*    (2018.01)
*G06F 21/52*    (2013.01)

(52) U.S. Cl.
CPC ...... *G06F 9/30134* (2013.01); *G06F 9/30116* (2013.01); *G06F 21/52* (2013.01)

(58) Field of Classification Search
CPC .. G06F 9/30134; G06F 9/30116; G06F 21/52; G06F 2212/1052; G06F 21/54; G06F 9/30036; G06F 21/566
See application file for complete search history.

(56) References Cited

U.S. PATENT DOCUMENTS

| 9,935,975 | B2 * | 4/2018 | Wilkerson ............ G06F 12/145 |
| 10,091,224 | B2 | 10/2018 | Olinsky |
| 10,394,556 | B2 | 8/2019 | Shanbhogue et al. |
| 10,430,580 | B2 | 10/2019 | Shanbhogue et al. |

(Continued)

OTHER PUBLICATIONS

European Search Report and Search Opinion, EP App. No 20211742. 0, dated May 19, 2021, 8 pages.

(Continued)

*Primary Examiner* — Corey S Faherty
(74) *Attorney, Agent, or Firm* — Nicholson De Vos Webster & Elliott LLP

(57) ABSTRACT

An apparatus and method for efficiently managing shadow stacks. For example, one embodiment of a processor comprises: a plurality of registers to store a plurality of shadow stack pointers (SSPs); event processing circuitry to select a first SSP of the plurality of SSPs from a first register of the plurality of registers responsive to receipt of a first event associated with a first event priority level, the first SSP usable to identify a top of a first shadow stack; verification and utilization checking circuitry to determine whether the first SSP has been previously verified, wherein if the first SSP has not been previously verified then initiating a set of atomic operations to verify the first SSP and confirm that the first SSP is not in use, the set of atomic operations using a locking operation to lock data until the set of atomic operations are complete.

20 Claims, 20 Drawing Sheets

(56) References Cited

U.S. PATENT DOCUMENTS

| | | | |
|---|---|---|---|
| 10,885,183 B2* | 1/2021 | Singh | G06F 21/56 |
| 2016/0381050 A1 | 12/2016 | Brandt et al. | |
| 2017/0177339 A1 | 6/2017 | Shanbhogue et al. | |
| 2017/0228535 A1* | 8/2017 | Shanbhogue | G06F 9/461 |
| 2020/0042318 A1 | 2/2020 | Shanbhogue et al. | |
| 2020/0089871 A1 | 3/2020 | Shanbhogue et al. | |
| 2021/0109684 A1 | 4/2021 | Shanbhogue et al. | |
| 2021/0357213 A1 | 11/2021 | Shanbhogue et al. | |
| 2021/0382987 A1 | 12/2021 | Shanbhogue et al. | |

OTHER PUBLICATIONS

Hofmann et al., "Ensuring Operating System Kernel Integrity with OSck", ASPLOS'11, Mar. 5-11, 2011, pp. 279-290.
Non-Final Office Action, U.S. Appl. No. 16/833,599, dated Jun. 4, 2021, 6 pages.
Notice of Allowance, U.S. Appl. No. 16/833,599, dated Oct. 13, 2021, 7 pages.
Zhou et al., "Silhouette: Efficient Protected Shadow Stacks for Embedded Systems", USENIX Security Symposium, Aug. 12-14, 2020, 19 pages.

* cited by examiner

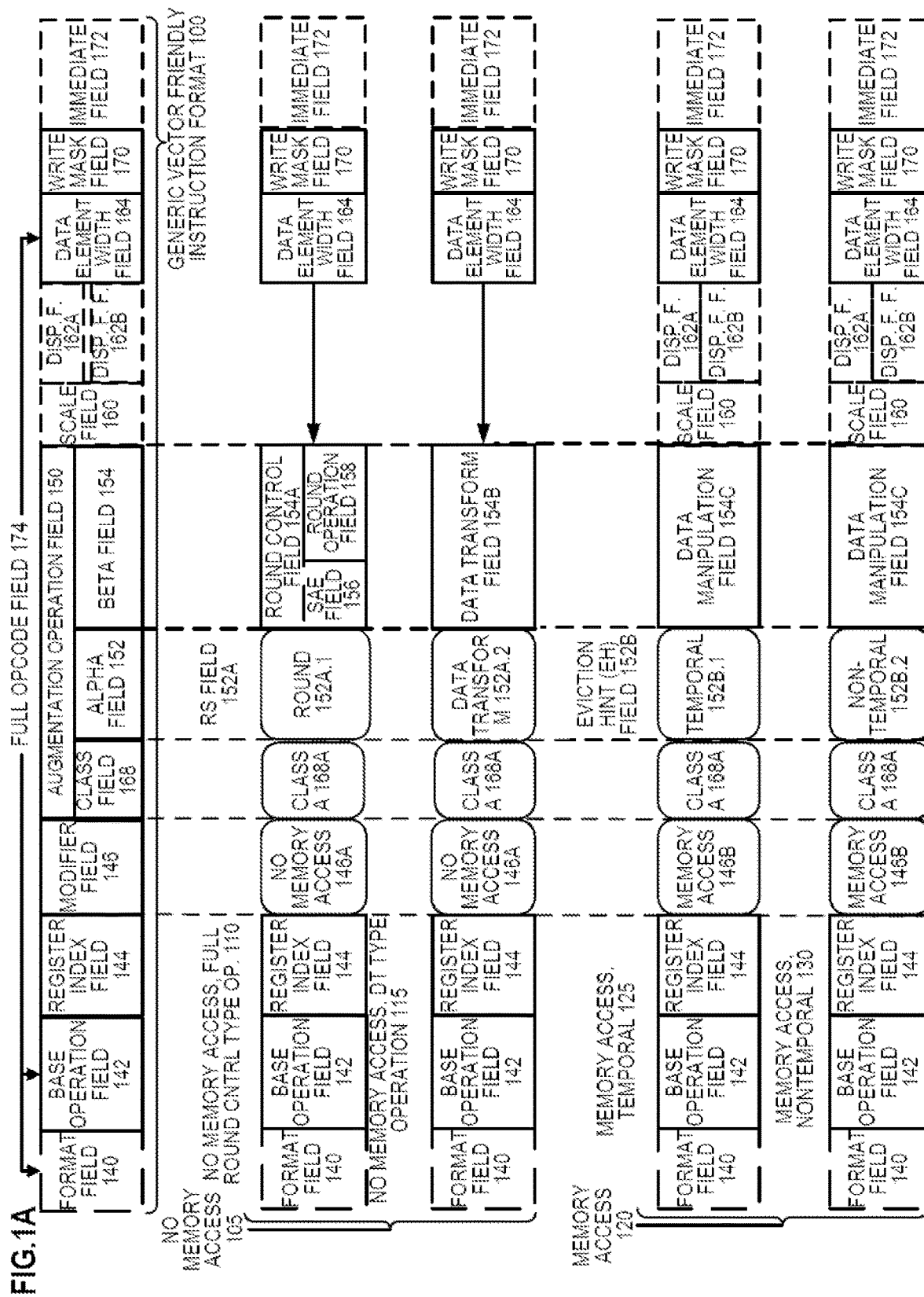

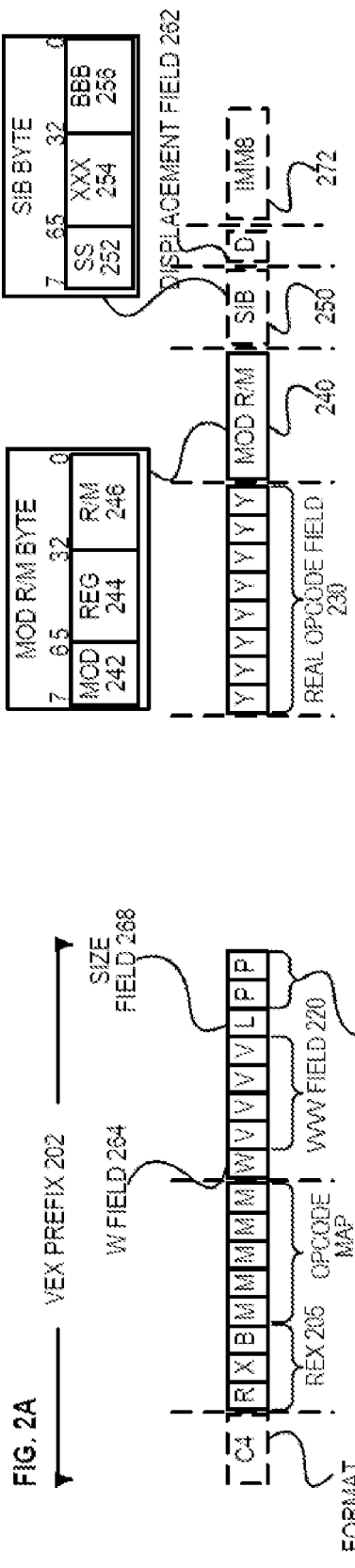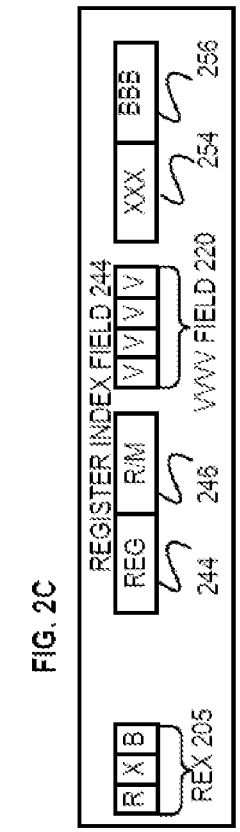
FIG. 2A
FIG. 2B
FIG. 2C

SHADOW STACK ISA EXTENSIONS TO SUPPORT FAST RETURN AND EVENT DELIVERY (FRED) ARCHITECTURE

CROSS-REFERENCE TO RELATED APPLICATIONS

This application is a continuation of application Ser. No. 16/833,599, filed Mar. 28, 2020, which is hereby incorporated by reference.

TECHNICAL FIELD

The embodiments of the invention relate generally to the field of computer processors. More particularly, the embodiments relate to an apparatus and method to efficiently manage and process shadow stacks.

BACKGROUND ART

Return-oriented programming (ROP) exploits are an increasingly common form of malicious software (malware) that may circumvent certain defenses that mark locations of memory as non-executable. An ROP exploit works by stringing together a large number of existing segments of executable code that each end with a "return" instruction (known as gadgets). Each ROP gadget is typically short, and typically does not correspond to an existing procedure or even an existing instruction boundary in the executable code. The attacker constructs a malicious stack including a series of return addresses pointing to the desired sequence of gadgets. The ROP exploit is performed by causing the processor of the computer to execute software using the malicious stack instead of the legitimate system stack. For example, the malicious stack may be introduced by smashing the stack, using a buffer overflow exploit, pivoting to a new stack, or otherwise corrupting the system stack.

Certain ROP exploits may be prevented by maintaining a "shadow stack" in parallel with the ordinary system stack (also called the "legacy stack"). The shadow stack maintains a copy of the legacy stack in memory inaccessible to ordinary software, and may be used to determine if the legacy stack has been tampered with by malware. The shadow stack may be implemented using binary instrumentation, which introduces a significant performance slowdown for some usages.

Other measures are available to help prevent ROP exploits. For example, "canary" values may be inserted near return addresses in the stack, and may be monitored for changes. As another example, "control transfer terminating instructions" may be inserted into binaries to specifically identify legitimate return targets. However such measures may require recompiling or otherwise modifying guest software. Additionally, certain processor architectures may provide a call stack that is inaccessible to certain software. For example, certain microcontrollers may maintain a call stack that is inaccessible to software. As another example, certain processor architectures may maintain call stack information in a separate memory region from other stack values such as automatic variables.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
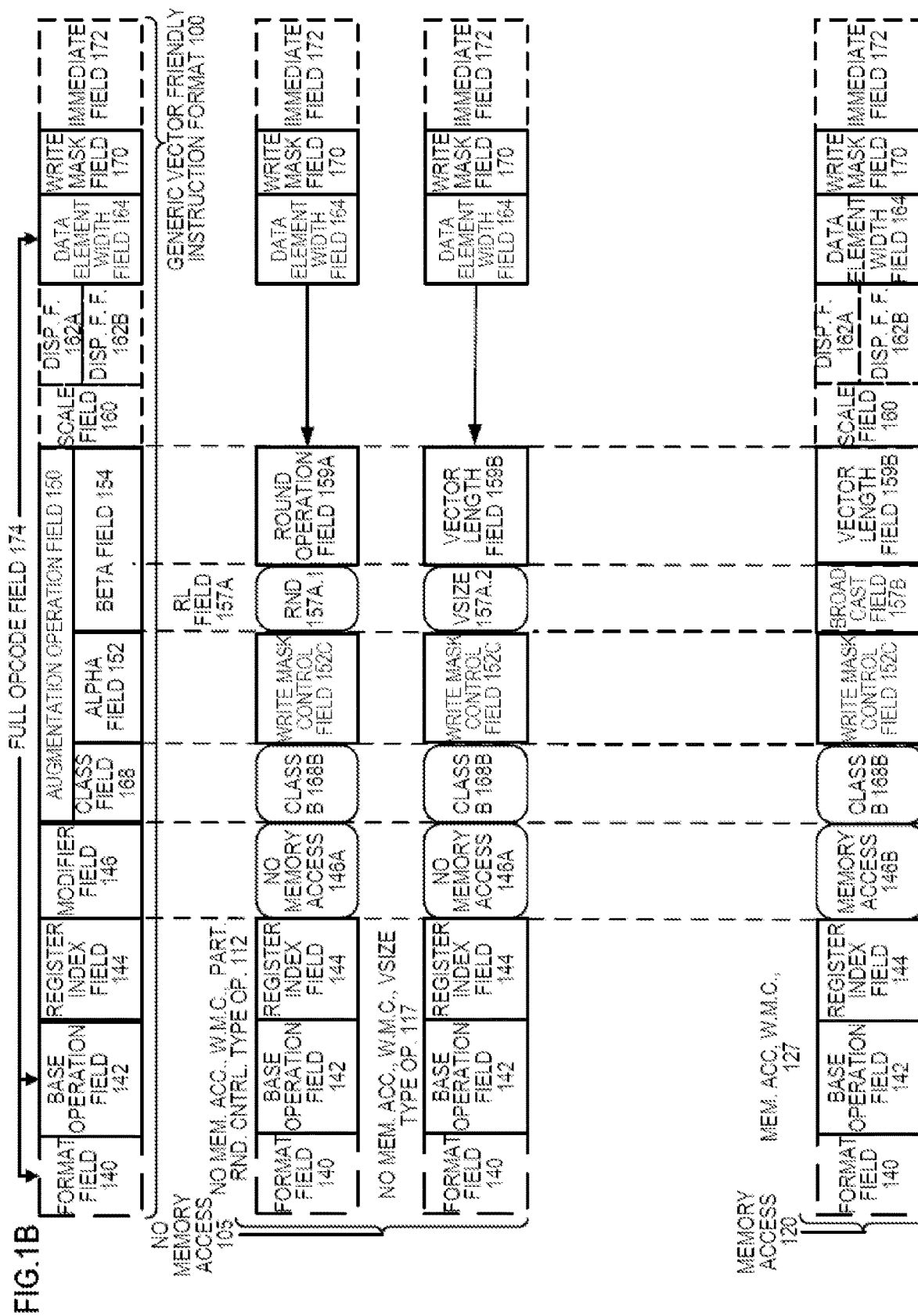

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*\text{index}+\text{base}$).

Displacement Field 162A—its content is used as part of memory address generation (e.g., for address generation that uses $2^{scale}*\text{index}+\text{base}+\text{displacement}$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]—mmmmm) includes content to encode an implied leading opcode byte. W Field 264 (VEX byte 2, bit [7]—W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

Figure 3:
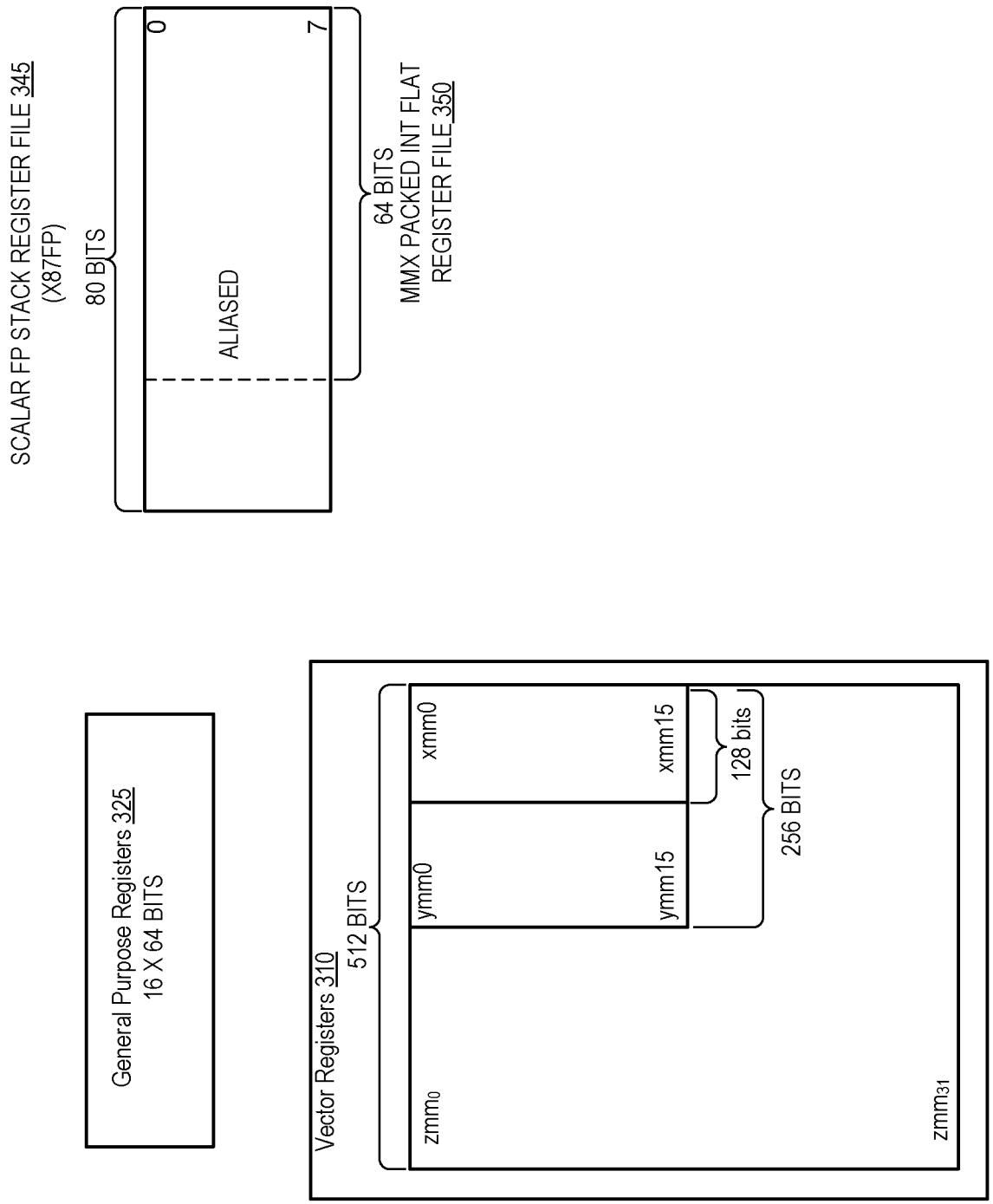
FIG. 3 is a block diagram of a register architecture according to one embodiment of the invention.

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4A:
FIG. 4A is a block diagram illustrating both an exemplary in-order fetch, decode, retire pipeline and an exemplary register renaming, out-of-order issue/execution pipeline according to embodiments of the invention.
Figure 4B:
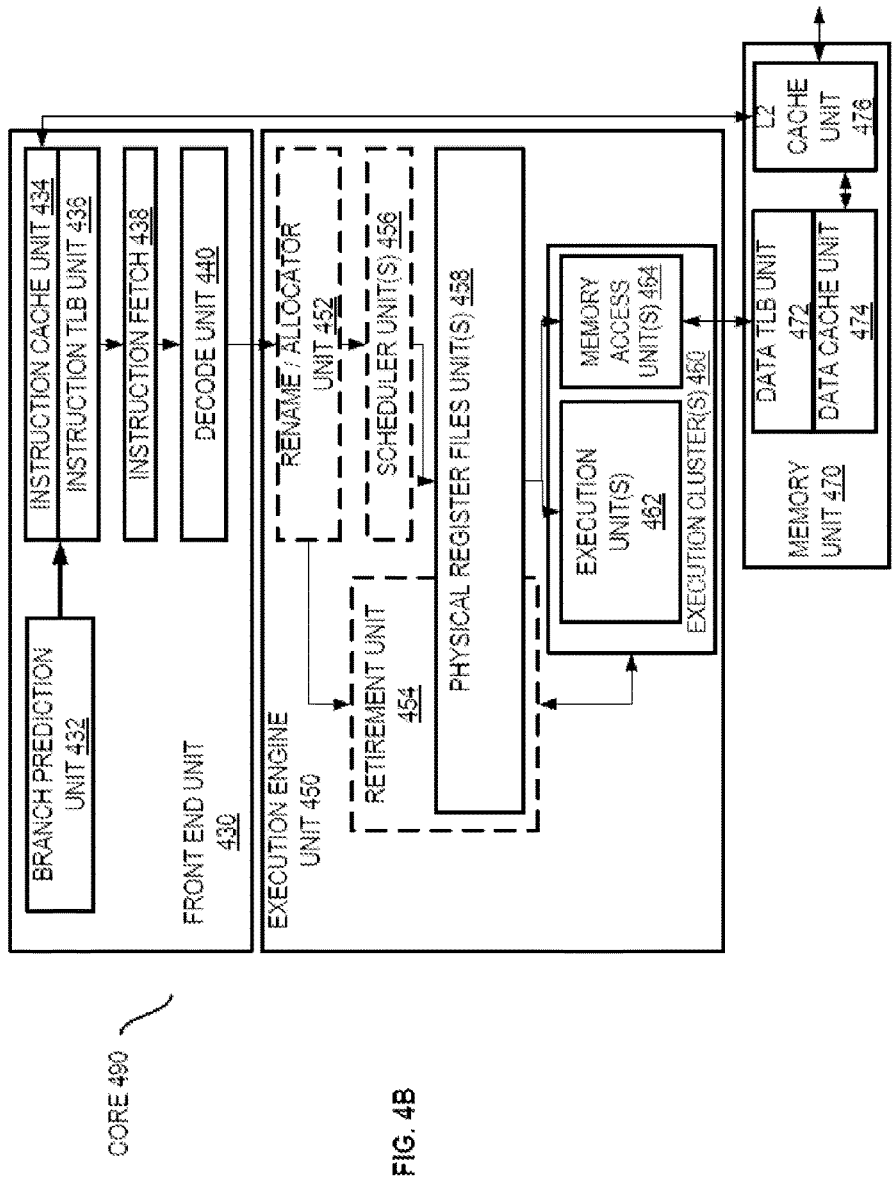
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
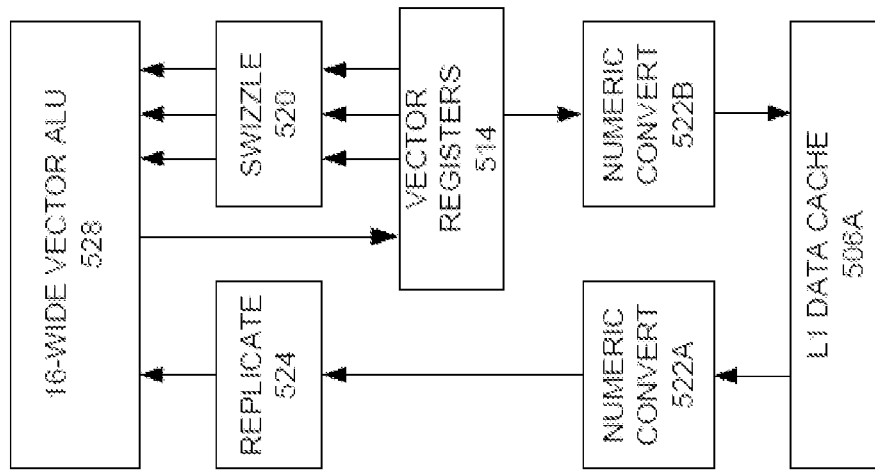
FIG. 5B illustrates an expanded view of part of the processor core in FIG. 5A according to embodiments of the invention.
Figure 5A:
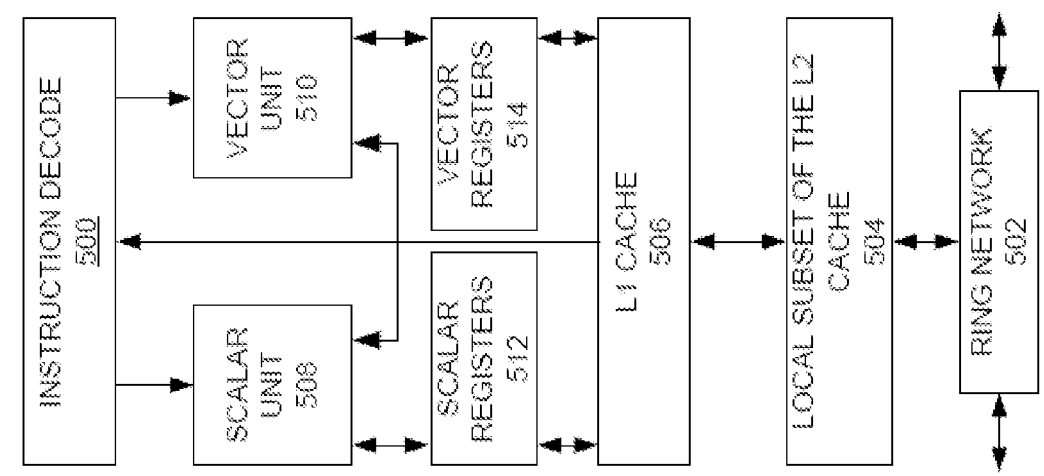
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
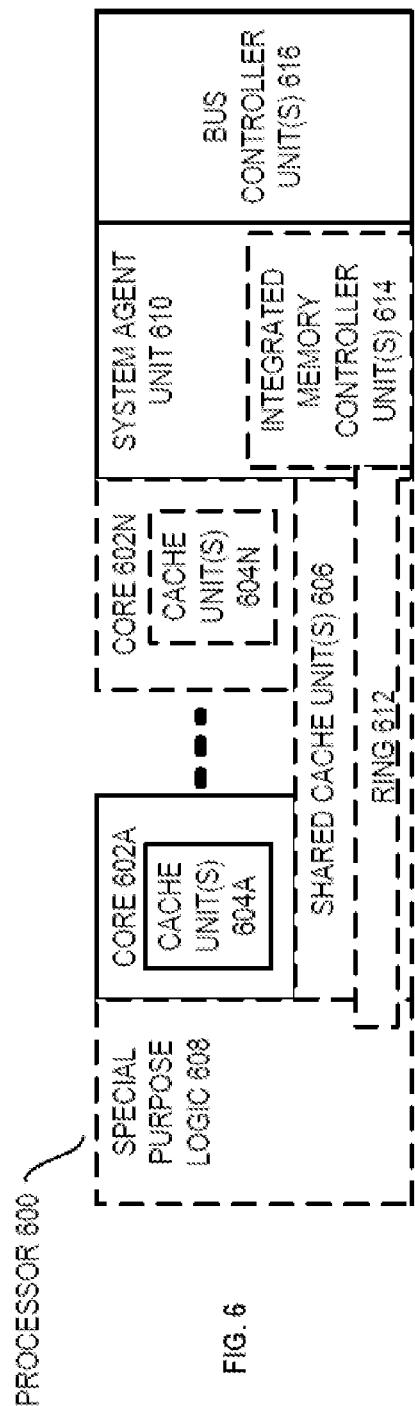
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multithreading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
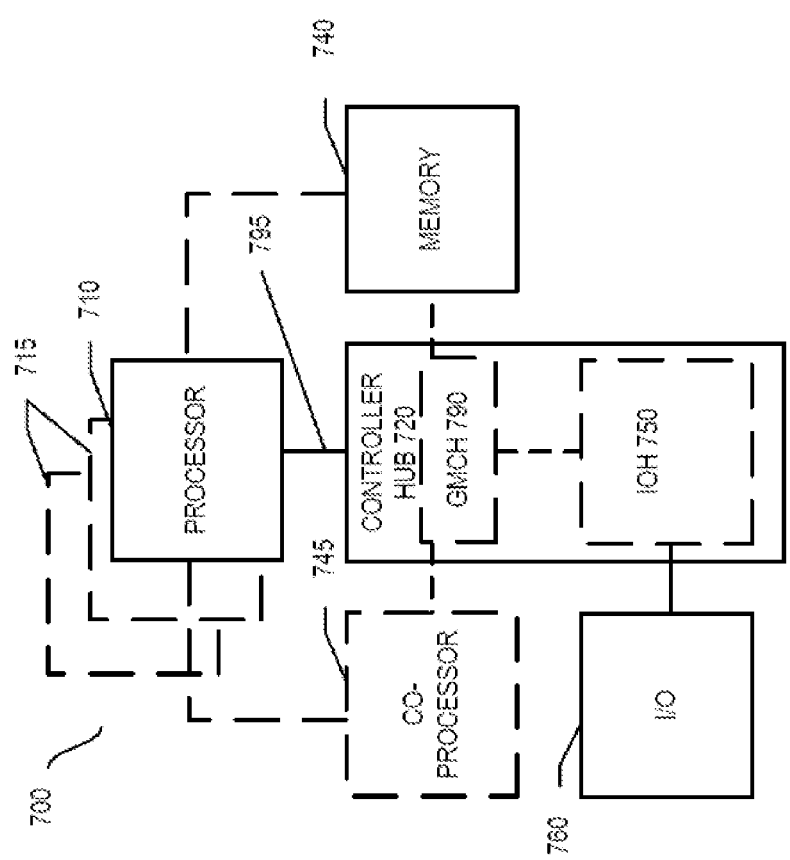
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random-access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
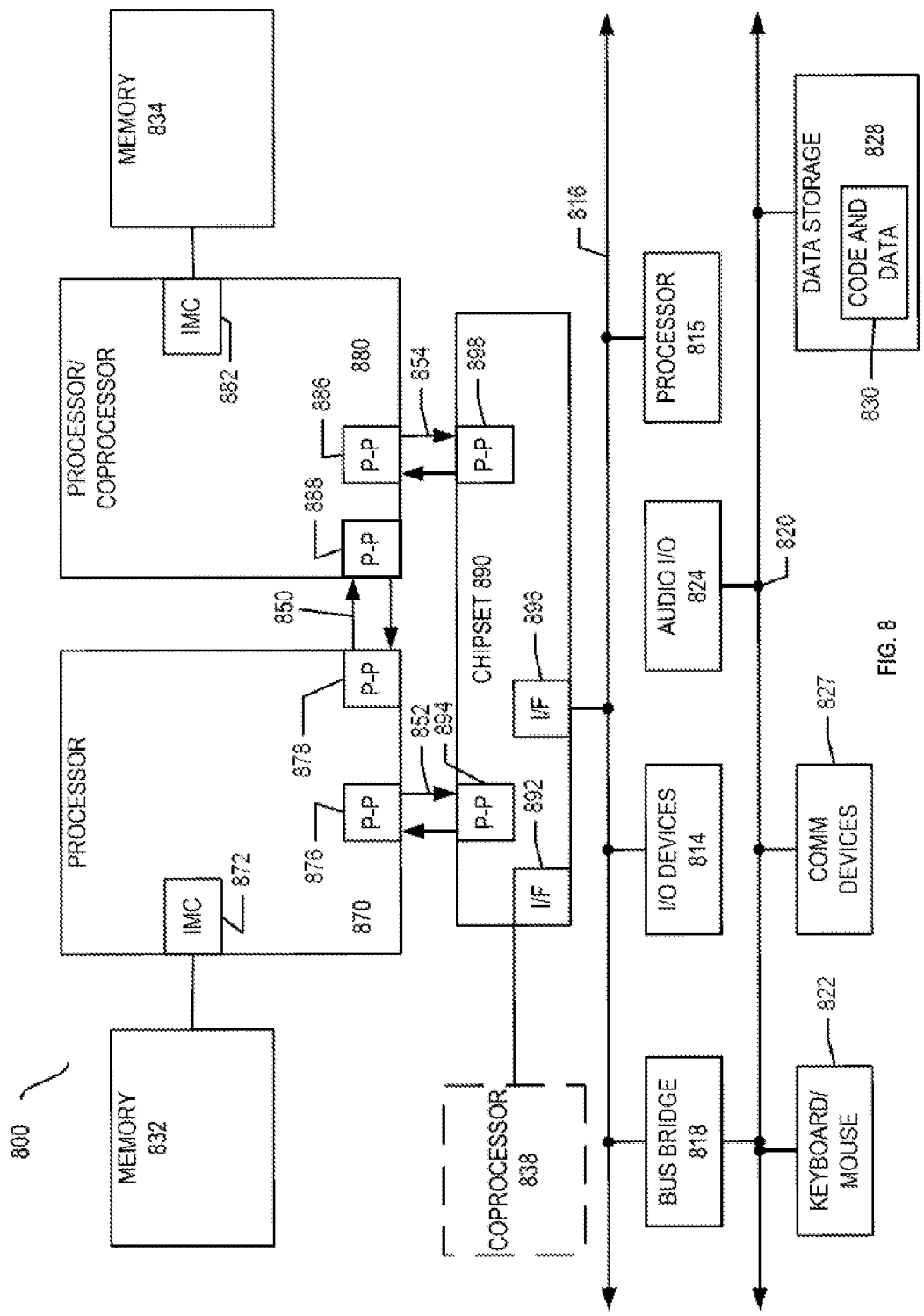
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
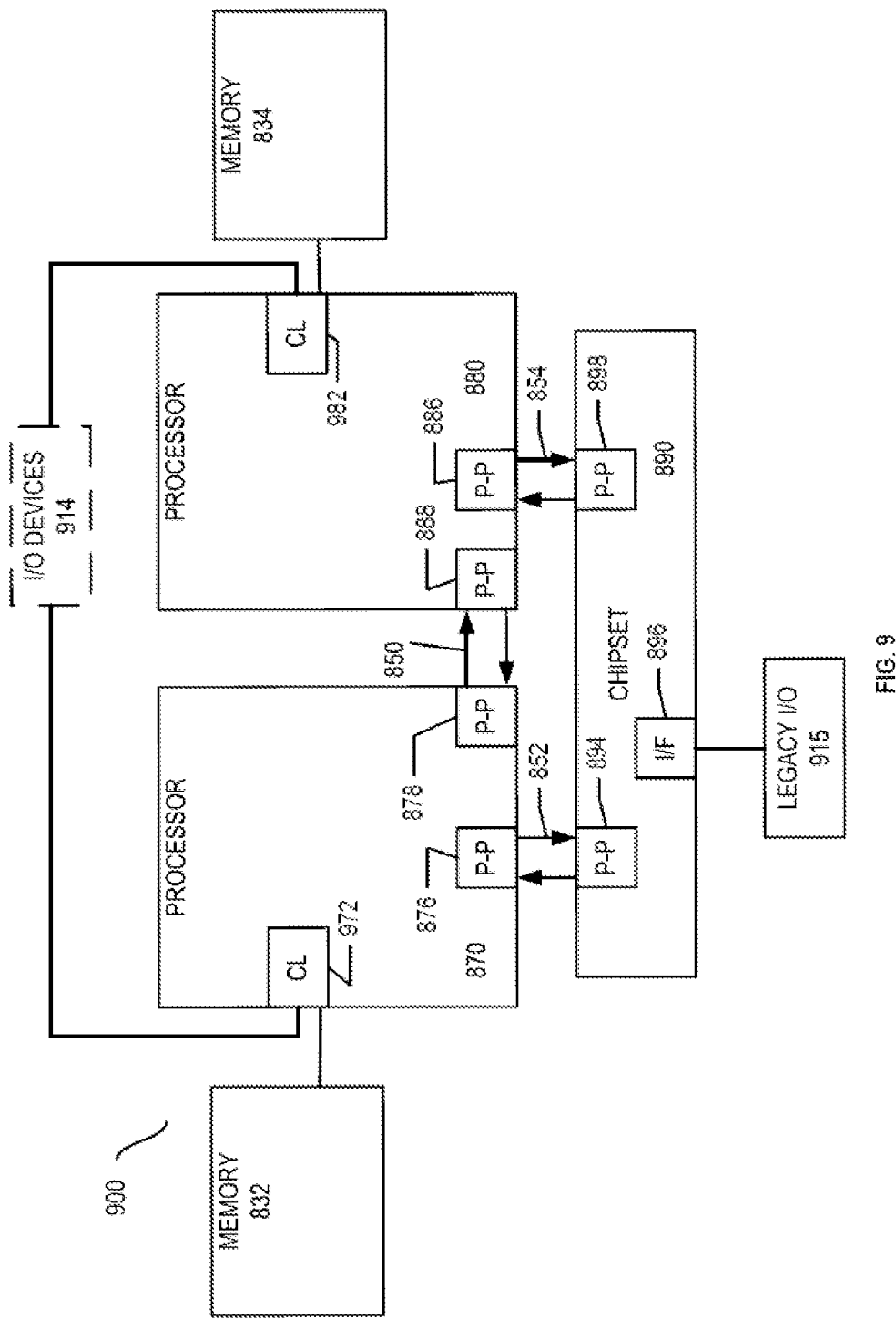
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
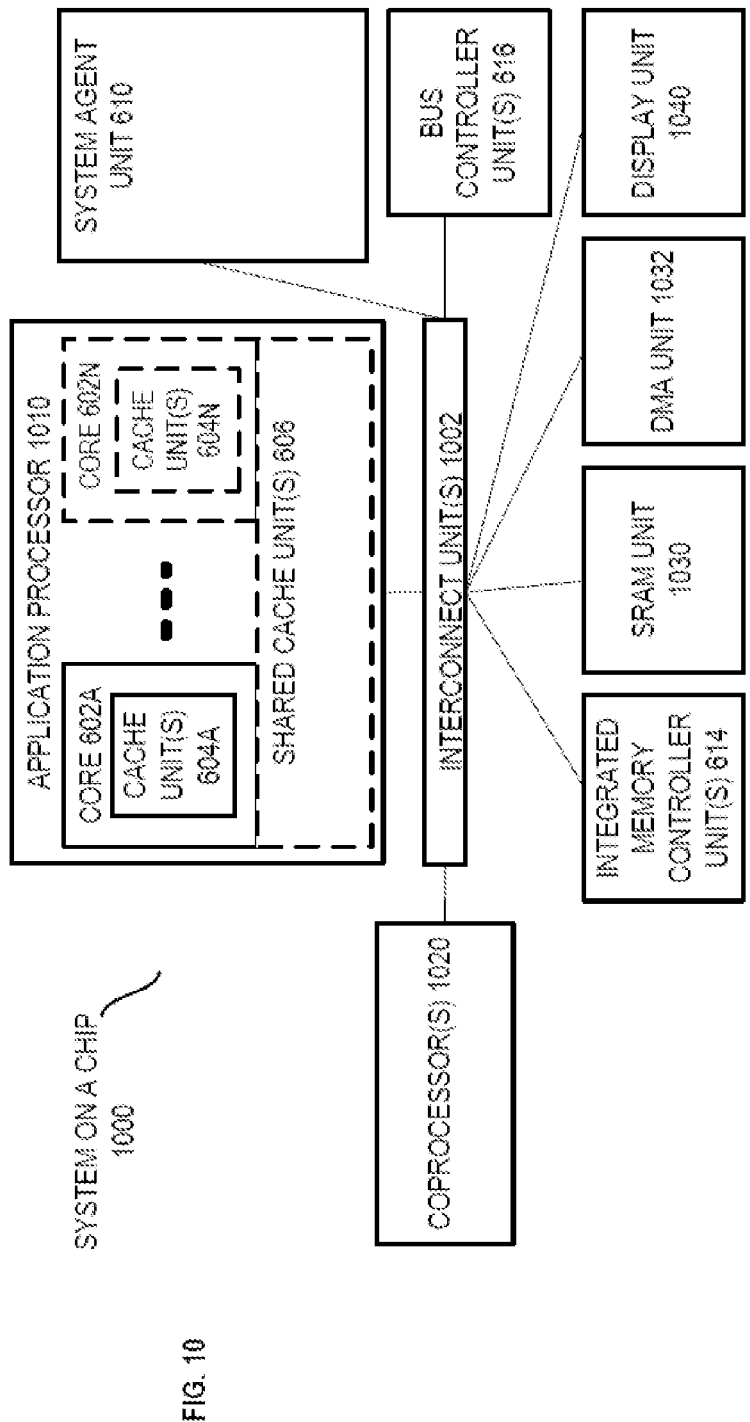
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
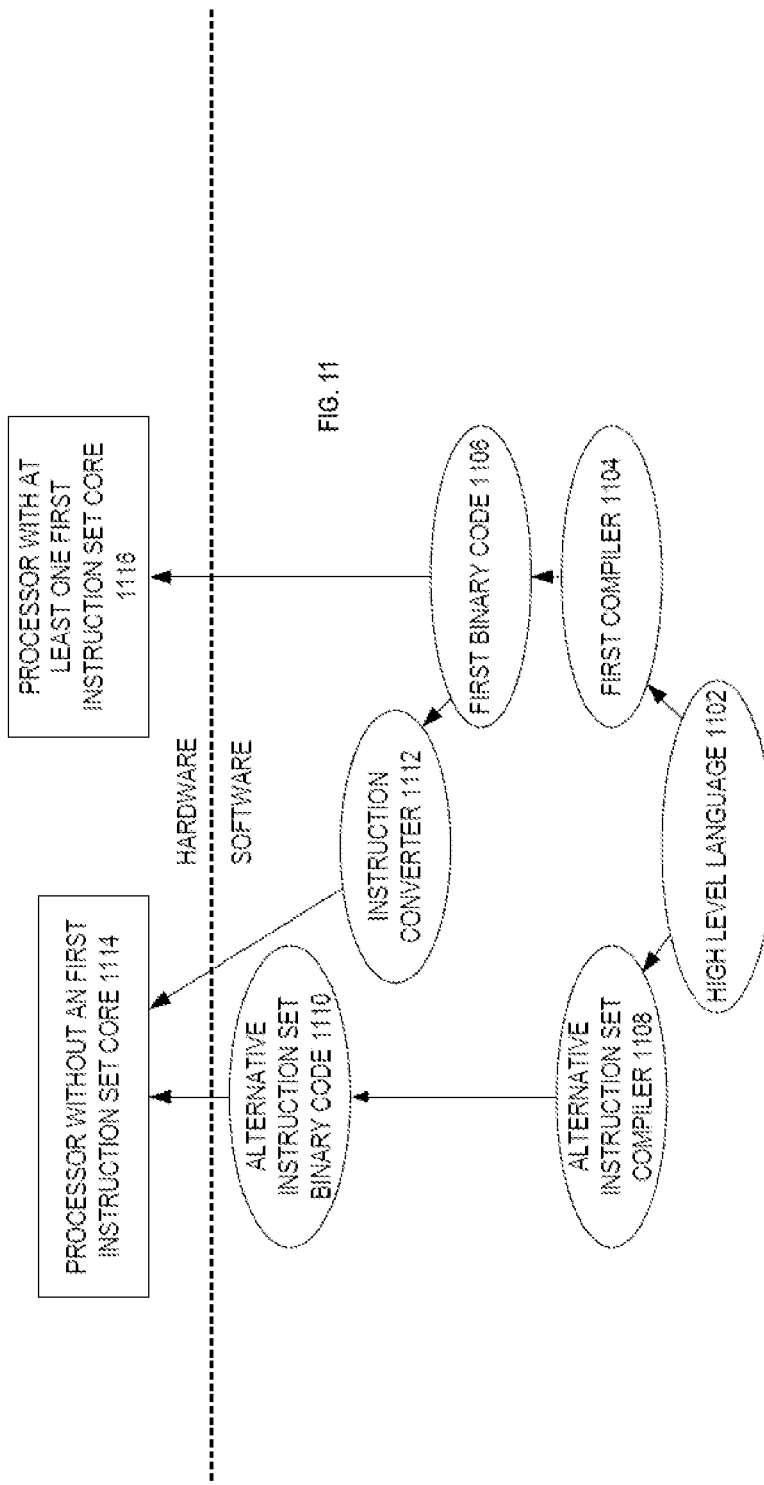
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method to Efficiently Manage and Process Shadow Stacks

One embodiment of the invention implements techniques to avoid atomic operations for verification of a token used to validate a shadow stack pointer (SSP) while retaining the underlying security properties of the token mechanism. In addition, certain embodiments include virtualization extensions to support an efficient token verification architecture.

In many situations, an instruction set architecture (ISA), such as an x86 architecture, provides a plurality of privilege levels at which instructions can be executed. The privilege levels are used to improve the reliability of an operating system (e.g., kernel) associated with the hardware platform by protecting resources from direct access by less trusted entities. In some embodiments, these privilege levels range from Ring 0, the most trusted privilege level (e.g., a supervisor mode), to Ring 3, or an unprivileged level (e.g., application or user mode). Each privilege level requires some resources to be pre-allocated and stored away for subsequent use upon a ring transition to a new privilege level.

A current privilege level of a processor controls instruction execution. The processor may change its current privilege level to control accessibility by an application to system resources such as system registers, system instructions, and specified system memory regions. In executing the application, the processor utilizes a data stack which stores both data (e.g., parameters and other data passed to subroutines, etc.) and control information for directing control flow of the executed instructions. Typically, the control information includes one or more return addresses to which the control flow will return when the called procedure completes.

In a return-oriented programming (ROP) attack, attackers seek to gain control of the data stack to hijack program control flow. For example, an attacker may perform unauthorized stack modifications of a procedure's return address stored in the data stack. The unauthorized stack modifications are used to divert the control flow of a current process to an arbitrary memory location to further the goals of the hack. One factor that makes the data stack more vulnerable to ROP and other types of control flow subversion attacks is that the stack generally stores both the data and the control information and thus the data stack needs to be writeable by software. Other factors that make the data stack more vulnerable to such attacks is that switching of the data stack is generally performed as an unprivileged operation.

In response to some events (e.g., interrupts/exceptions), the processor may transfer control for a sequence of instructions executed at an unprivileged user level to a supervisor privilege level in order to access resources that are required to handle that event. These factors as discussed above may tend to increase system exposure to control flow subversion attacks due to exploited bugs that allow the stack pointer and/or control flow information (e.g., return addresses) to be modified (e.g., to point to malware/attacker controlled memory).

Embodiments of the invention include techniques to protect stacks from control flow subversion attacks on privilege transfers. In one embodiment, a number of "shadow" stacks are provided to protect the control information on the data stack from tampering attempts. As used herein, a shadow stack is a second stack separate from the data stack and is employed to store and protect information from the data stack that is used in control transfer operations. For example, the shadow stack may store control information but not the data (e.g., not parameters and other data of the type stored on the stack that user-level application programs write and modify).

In some embodiments, the shadow stack is writeable only by certain instructions, such as "CALL" (which is an example of a procedure calling mechanisms using a data stack) and "FAR CALL" (an example of a branch instruction that implements both micro branch and macro branch jump instructions) that perform control transfer operations and flows (e.g., interrupt/exception delivery). In such situations, the shadow stack may not be writeable by other software initiated stores through other instructions, such as "MOV" that transfers a plurality of bytes in a single operation and "XSAVE" that are used to store a context state to memory and restore the context state from a memory to a processor's registers. This write protection is achieve by marking the memory used for shadow stacks in the page tables as being shadow stack memory such that stores initiated by software using instructions like "MOV", "XSAVE", etc. do not complete and fault. Likewise, the instructions such as "CALL", when they generate store instructions that are intended for the shadow stack memory, use specific store operations such that they complete only if the memory to which the store is performed is marked in the page tables as shadow stack memory. Otherwise, a fault occurs.

In some embodiments, the shadow stacks may optionally be configured for operation individually in an unprivileged user-level mode (e.g., a ring 3 privilege level) or in a privileged or supervisor privilege level mode (a ring 0, ring 1, or ring 2 privilege level). To support switching shadow stacks on privilege switches from a source privilege level to a new privilege level, one implementation includes registers associated with each privilege level.

In some embodiments, system software (e.g., system kernel or operating system) loads a shadow stack pointer (SSP) into one or more registers at each privilege level. The processor then accesses the SSP via a register associated with a new privilege level to identify a shadow stack for that privilege level. In operation, once the processor selects an SSP for the new privilege level, the processor validates/verifies the SSP for use by the processor at the new level. If the validation is successful, the processor sets the shadow stack at the new privilege level as busy and pushes return address information for the source privilege level onto the shadow stack. Thereafter, embodiments of the present disclosure ensure that any transition of the processor back to the source privilege level is verified before the shadow stack is marked as not busy. This verification includes ensuring that the return address of the source privilege level pushed onto the shadow stack matches a current address associated with the data stack. In order to perform this verification, the processor uses specific load operations (e.g., "shadowStack-Pop" or loads with shadow stack semantics) such that if the load operation is not to memory marked as shadow stack memory in the page tables then this load does not complete (e.g., generates a fault condition). Thus any attempt to point the shadow stack pointer to non-shadow stack memory is detected and prevented.

In other embodiments, the techniques described herein may be used, for example, to protect shadow stack switching as part of an interrupt/exception delivery or as part of task switching from a current task at the source privilege level to a new task at a new privilege level, to perform fast system calls (e.g., a user mode privilege transition to a mode with full control of the hardware authority) with shadow stacks, to protect shadow stacks from cross thread attacks, such as an attack from a less privileged process to a more privileged process, as well as to protect the shadow stacks during ring transitions from other types of unauthorized stack modifications employed by attackers.

Figure 12:
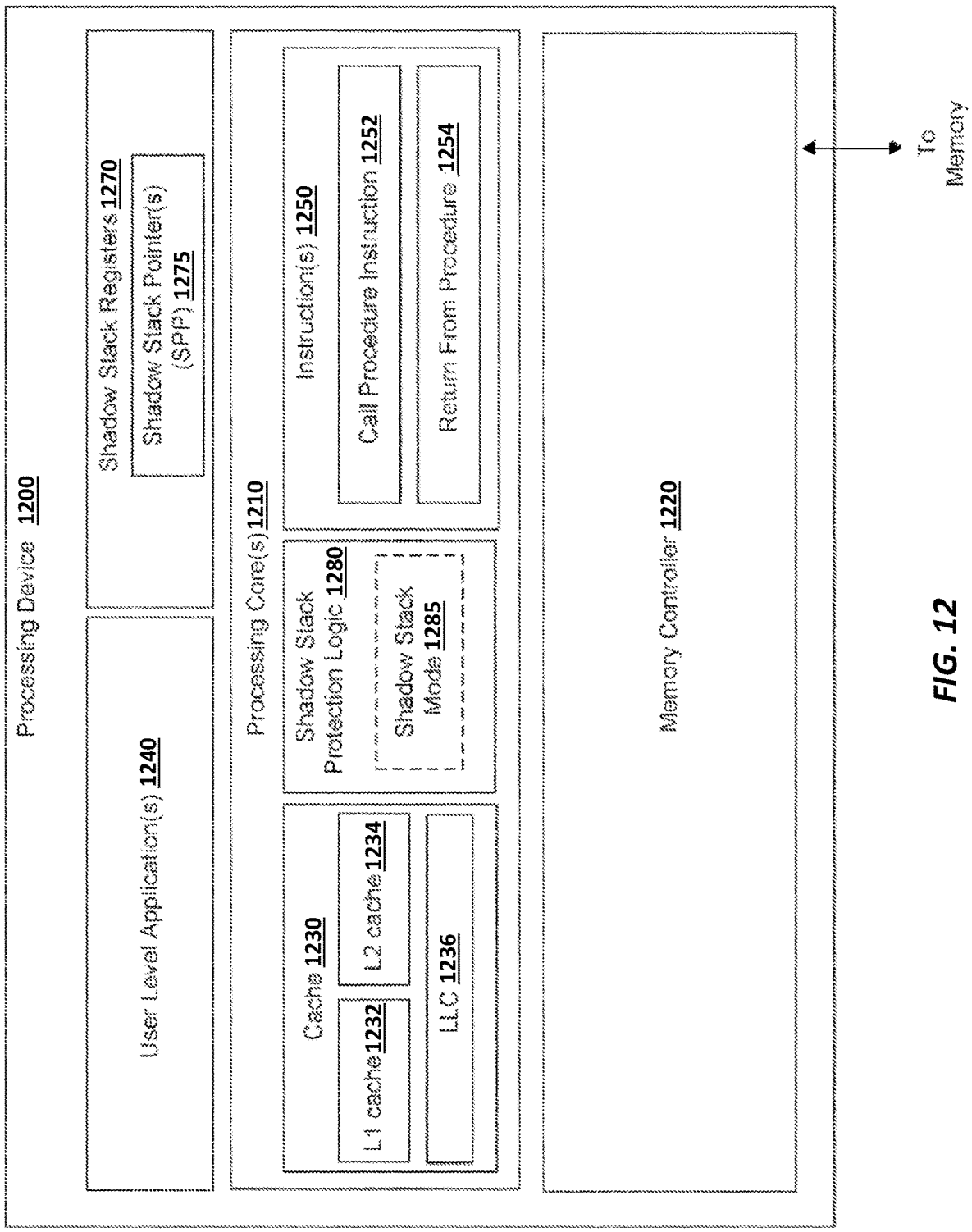
FIG. 12 illustrates a processing device with shadow stacks in accordance with one embodiment.

FIG. 12 illustrates a block diagram of a processing device to support processor extensions to protect stacks during ring transitions according to one embodiment. The processing device may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 12, a processing device may include various components. In one embodiment, processing device may include one or more processors cores 1210 and a memory controller unit 1220, among other components, coupled to each other as shown. The processing device may also include a communication component (not shown) that may be used for point-to-point communication between various components of the processing device 1200. The processing device may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device may be used in a system on a chip (SoC) system. In one embodiment, the SoC may comprise processing device and a memory. The memory for one such system is a DRAM memory. The DRAM memory can be located on the same chip as the processor and other system components. Additionally, other logic blocks such as a memory controller or graphics controller can also be located on the chip.

The processor core(s) 1210 may execute instructions for the processing device 1200. The instructions may include, but are not limited to, pre-fetch logic to fetch instructions, decode logic to decode the instructions, execution logic to execute instructions and the like. The computing system may be representative of processing systems based on the Intel x86 family of processors and/or microprocessors available from Intel® Corporation of Santa Clara, Calif. (e.g., Intel Core i5, i7 processors, etc), although other systems including computing devices having other microprocessors, engineering workstations, set-top boxes and the like may also be used. In one embodiment, a sample computing system may execute a version of an operating system, embedded software, and/or graphical user interfaces. Thus, embodiments of the disclosure are not limited to any specific combination of hardware circuitry and software.

In an illustrative example, processing core 1210 may have a micro-architecture including processor logic and circuits. Processor cores with different micro-architectures can share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

Memory controller 1220 may perform functions that enable the processing device to access and communicate with memory (not shown) that includes a volatile memory and/or a non-volatile memory. In some embodiments, the memory controller 1220 may be located on a processor die associated with processing device 1200, while the memory is located off the processor die. In some embodiments, the processing device includes a cache unit 1230 to cache instructions and/or data. The cache unit 1230 includes, but is not limited to, a level one (L1) 1232, level two (L2) 1234, and a last level cache (LLC) 1236, or any other configuration of the cache memory within the processing device 1200. In some embodiments, the L1 cache 1232 and L2 cache 1234 can transfer data to and from the LLC 1236. In one embodiment, the memory controller 1220 can be connected to the LLC 1236 to transfer data between the cache unit 1230 and memory. As shown, the cache unit 1230 can be integrated into the processing cores 1210. The cache unit 1230 may store data (e.g., including instructions) that are utilized by one or more components of the processing device 1200.

In some embodiments, the processing device may execute one or more user level applications 1240 (e.g., a user-level multithreaded application). Such user-level applications 1240 may be executed by system software (not shown) installed at the processing device 1200. Examples of system software include, but are not limited to, one or more operating systems, a virtual machine monitor (VMM), a hypervisor, and the like, and combinations thereof. The user-level applications 1240 may use instructions (e.g., instructions 1250) to control the processing device as disclosed herein. The instructions 1250 may represent macroinstructions, assembly language instructions, or machine-level instructions that are provided to the processing core 1210 for execution.

In some embodiments, the processing core 1210 is operative to perform an embodiment of a call procedure instruction 1252 and an embodiment of a return from procedure instruction 1254 as specified by the instructions 1250. The call procedure instruction 1252 will often be referred to simply as a call instruction, and the return from procedure instruction 1254 will often be referred to simply as a return instruction. The call and return instructions may represent instructions or control signals of a particular instruction set for the processing device to execute at a certain privilege level. During operation, the processing core 1210 may receive the call instruction 1252. For example, the call instruction 1252 may be received from a calling procedure associated with user-level applications 1240 that is calling a subroutine, routine, interrupt handler, or the like. In some embodiments, an address of the return instruction 1254 may be pushed onto a data stack stored in memory when functions or procedures have been called.

If the call instruction 1252 causes a change in the current privilege level of the processing device 1200, the processing device performs a stack switch from the current stack to a stack defined for the new privilege level. For example, the call instruction 1252 may cause the processing device to change the current privilege level to access certain system resources that are not accessible at the current privilege level. In some embodiments, one or more shadow stacks stored in memory are used to help to protect the data stack from tampering and/or to help to increase computer security. The information stored on the shadow stack(s) may represent return address related information related to the return instruction 1254 (e.g., actual return addresses, information to validate/verify return addresses, other return address information).

To identify the current shadow stack for a particular privilege level, the processing device includes a number of shadow stack registers 1270 where each register is associated with a certain privilege level. As an illustrative example, the processing device may include four (4) registers referred to as IA32_PLx_SSP where x represent a privilege level (e.g., 0, 1, 2 or 3). In some embodiments, the shadow stack registers 1270 may be model specific registers (MSRs) or general purpose registers (GPRs). In other embodiments, various types of structures can be used as the registers 1270 so long as they are capable of storing and providing data as described herein.

At startup of the processing device 1200, system software associated with the device may program a stack pointer (SSP) 1275 into each of the shadow stack registers 1270. The stack pointer (SSP) 1275 is operative to identify a particular shadow stack for the privilege level identified by the register. For example, the SSP 1275 may be a linear address in memory that points to the top of a shadow stack. In one embodiment, the processing device may include shadow stack protection logic 1280 to control access to the shadow stacks via the shadow stack registers 1270 during ring transitions.

The shadow stack protection logic 1280 may also enforce that loads and stores intended for the shadow stack generate a fault condition if the address to which this load or store is performed is not marked in the page tables as being of shadow stack type. This shadow stack protection logic 1280 may also prevent stores to shadow stack memory by software initiated stores through instructions, such as "MOV" and "XSAVE". In some embodiments, the shadow stack protection logic 1280 may also include an optional configurable shadow stack mode 1285. The shadow stack mode 1285 may be a bit indicator that is configured to alternately enable and disable use of the shadow stacks by the processing device 1200. Alternatively, the shadow stacks may optionally always be enabled and the shadow stack mode 1285 may optionally be omitted. Alternately, there may be a shadow stack mode corresponding to each of the privilege levels.

Figure 13:
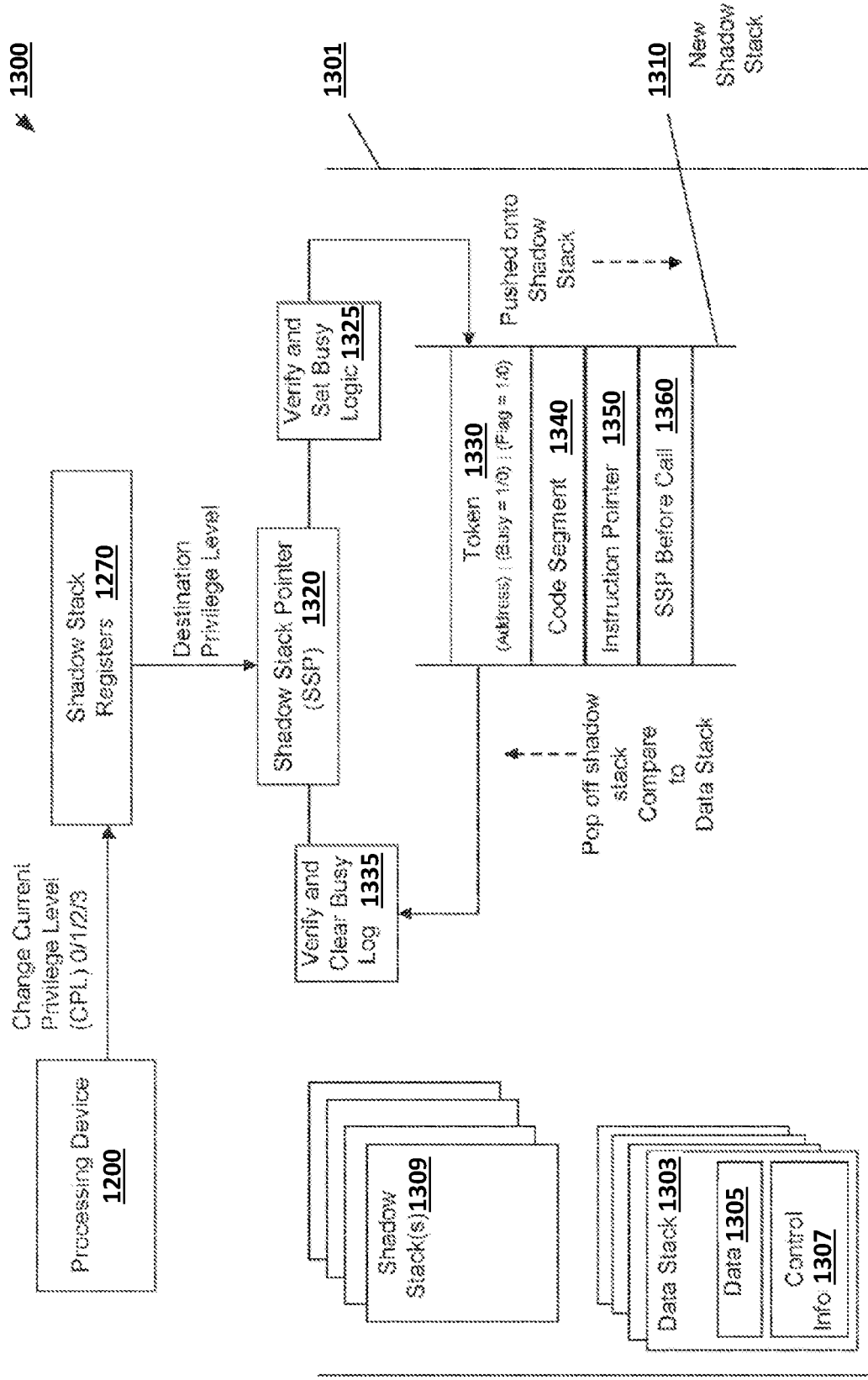
FIG. 13 illustrates shadow stack pointer management in accordance with one embodiment.

FIG. 13 illustrates a system 1300 including a memory 1301 for supporting processor extensions to protect stacks during ring transitions according to one embodiment. In this example, the memory 1301 stores one or more data stacks, such as data stack 1303. The data stacks are sometimes referred to as the call stack, the data stack, or just the stack. Data stack 1303 may represent a stack type data structure that is operative to store both data 1305 and control information 1307 for directing a control flow of an executed instruction. Typically, there is a data stack 1303 for each privilege level associated with the processing device 1200. As such, when the processing device switches privilege level it also switches the data stack 1303 like it does for the shadow stack as described in the present disclosure. The data 1305 for each data stack may represent any of a wide variety of different types of data that can be push onto the data stack 1301 (e.g., parameters and other data passed to subroutines, etc.). Commonly, the control information 1307 may include one or more return addresses for one or more previously performed procedure calls. These return addresses may represent instruction addresses where a called procedure is to return control flow when the called procedure finishes and returns.

As shown in FIG. 13, the memory 1301 also includes a plurality of shadow stacks 1309. The shadow stacks 1309 are used to help protect the data stack 1303 from certain type of control flow attacks. The shadow stacks 1309 may represent additional stack type data structures that are separate from the data stack 1303. In some embodiments, the shadow stacks 1309 may be used to store information associated with the control information 1307 of an executed instruction but not the data 1305. In one illustrative example, the shadow stacks 1309 may store a code segment (CS) descriptor, such as CS 1340, that specific the code segment in memory 1301 being executed and an instruction pointer (EIP), such as EIP 1350, that may identify a return address related to an instruction in the data stack 1303 as well other information. In some embodiments, the memory used to create the shadow stacks may be marked as being of shadow stack memory type in the page tables, such that loads and stores to the shadow stack fault if they are not to memory of type shadow stack. Similarly, stores not intended for the shadow stack fault if they are made to memory marked as shadow stack memory.

Although system 1300 may include a plurality of shadow stacks 1309, only one shadow stack at a time may be selected as a current shadow stack 1310. In this regard, the shadow stacks 1309 may individually operate in an unprivileged user-level mode (e.g., a ring 3 privilege level) or in a privileged or supervisor privilege level mode (a ring 0, ring 1, or ring 2 privilege level). In some embodiments, each of the shadow stacks 1309 includes a shadow stack pointer (SSP), such as SSP 1320, which is operative to identify the top of the shadow stack. For example, the SSP 1320 may be a linear address in memory 1301 that points to the top of a current shadow stack. As noted above, the SSP 1320 may be stored in one of the shadow stack registers 1270 associated with a particular privilege level.

As shown, the system 1300 may also include processing device from FIG. 12. In some embodiments, the processing device may have a current privilege level that controls the execution of an application in the system 1300. In certain situation, the processing device may change its current privilege level to a new privilege level in order to control accessibility of the application to resources of system 1300. For example, the processing device may change its current privilege level in response to certain types of operations, such as a called procedure, an interrupt/exception handler or in response to other type of operations. In some embodiments, the processing device may employ shadow stack protection logic 1280 to protect the stack during the privilege level transition.

In one example of a privilege level transition, the processing device may transition from a current privilege level (CPL) in a user mode (e.g., CPL3) to a new privilege level in a supervisor mode (e.g., CPL<3). This type of privilege level transition may be initiated, for example, by a call through a call gate that requests a change a higher privilege level or by calling an interrupt/exception handler. In response to the user mode to supervisor mode privilege level transition, the processing device checks whether the shadow stacks 1309 are enabled for the processing device at the new privilege level. For example, processing device may check the setting of the shadow stack mode 1285 indicator to determine whether the shadow stacks 1309 are enable or disable. If the shadow stacks 1309 are enabled, a current SSP associated with the user mode is saved to one of the shadow stack registers 1270. Thereupon, the new shadow stack 1310 is established for the supervisor mode using the SSP, such as SSP 1320, stored in the register associated with the new privilege level. In some embodiments, the user mode SSP is saved into the shadow stack register so that the processing device in the supervisor mode can modify the user mode SSP when necessary, such as to do shadow stack unwinds to remove entries from the stack and other types of fix ups before returning to the user mode again.

Once the processing device retrieves the SSP 1320 from the register associated the new privilege level, the processing device automatically performs several checks to verify the SSP programed in the register by using certain logic of the shadow stack protection logic 1280, such as the verify and set busy logic 1325. The automatic checks include, but are not limited to, verifying that the SSP 1320 programed in the register is pointing to a top of supervisor shadow stack (e.g., shadow stack 1310, the shadow stack identified by the SSP 1320 can be used for the current mode of platform hardware associated with the processing device and that shadow stack is not loaded onto any other process thread. These checks may be used to prevent certain attacks, such as a cross thread where an attacker may point the register on two different processor threads to the same shadow stack to manipulate the return address consumed on one processor by making calls on the second processor.

To perform the checks to verify the SSP 1320, system software (e.g., kernel or OS) of the processing device identifies a token 1330 at the top of the shadow stack 1310 pointed by the SSP. In some embodiments, the processing device may (e.g., atomically) load the (e.g., 8 bytes of) token 1330 from the address specified by the SSP 1320. In one embodiment, the loading of token 1330 locks the token and/or the location (e.g., cache line) to prevent the token from being copied or modified by another processor core or processing device. In one embodiment, loading of the token is done by the processing device using a specific shadow stack operation, such that if the address to which the load or store is performed is not memory marked as shadow stack memory in the page tables it causes a fault.

The token 1330 comprises a plurality of bits that are used to verify the SSP 1320 programed in the register. In some embodiments, the processing device analyzes the plurality of bits to identify set bits that represent a linear address of the token 1330, a busy indicator that can be a determined bit of the token set to a value (e.g., 1 or 0) indicating whether the shadow stack 1310 is already loaded onto any logical processor, a flag indicator that can be another determined bit of the token set to a value (e.g., 1 or 0) indicating whether the shadow stack 1310 is for use in a certain bit mode (e.g., 32-bit or 64-bit) as well as other relevant information.

In accordance with the verify logic 1325, the processing device checks that the busy indicator is not set (e.g., 0) indicating that the shadow stack 1310 is not already loaded onto any logical processor. The processing device also checks that the hardware platform of system 1300 is operating in a mode that matches the bit mode represented by the flag indicator. For example, based on the flag indicator, flag the processing device may determine that the shadow stack 1310 is for use on a 32-bit or 64 bit machine. The processing device may then check, for example, a platform register associated with the hardware platform to verify that the platform is in a corresponding operating mode (e.g., 32-bit or 64-bit). The processing device also checks that the linear address recorded in the token 1330 matches the linear address of the SSP 1320.

This check to match the linear addresses verifies that the register 1270 is pointing to the top of a valid shadow stack since the linear address of an 8 byte location on the shadow stack will not appear in the contents of those 8 bytes on a shadow stack except when created by system software to initialize the token 1330. As such, the token 1330 forms an indicator that the shadow stack pointer as stored in the register 1270 is pointing to the top of a valid shadow stack. In some embodiments, the processing device enforces that the shadow stack is aligned to 4 bytes or 8 bytes depending on whether the processing device is in 32 bit or 64 bit mode of operation, and thus, the lower 2 bits of the shadow stack pointer 1320 are always 0 and can be used to save the busy indicator and the flag of token 1330. If all of the above checks results in a correct indication, then the busy indicator of the token may be set to a value (e.g., 1) to indicate that the shadow stack pointed by the SSP 1320 is in use at the new privilege level. It should be noted that while these checks are being performed the memory location (e.g., the cache line) containing the token 1330 is locked by the processing device such that it cannot be modified (e.g., set busy by another logical processor). Subsequent to setting the busy bit the processor releases the lock on this memory location. Doing these checking operations with a lock held on the token ensures that there are no time-of-check-to-time-of-use issues. Otherwise if any of the above checks fail, the processing device may generate a fault or alert that can be transmitted, for example, to an operating system associated with the processing device 1200. In some embodiments, if a fault is generated, the lock on the memory location containing the token 1330 is released without modifying the contents of the location.

On a return to the user mode privilege level from the supervisor mode, such as a CPL 0/1/2->CPL 3 mode transition, the processing device performs several checks by using certain logic, such as verify and clear busy logic 1325. This type of privilege level transition may be initiated, for example, by an interrupt return (IRET) instruction or a "FAR RET" instruction that shifts the next address to be executed to the instruction pointer of the CPU or other types of return instructions.

As part of the return transition to the user mode privilege level, the processing device as directed by the verify and clear busy logic 1335 checks whether the busy indicator in the token 1330 is set and whether the linear address recorded in the token matches the address of the SSP 1320 and if the SSP 1320 is pointing to an 8 byte aligned address. If all of the above checks results in a correct indication, then the processing device marks the token 1330 as "free" by clearing the busy indicator in the token 1330. It should be noted that the token is loaded from the memory address pointed to by the SSP 1320 using a locked load such that the location (e.g., cache line) is locked from subsequent modifications. If the verification succeeds then the busy bit is cleared and the lock is released. If the verification does not succeed then the lock is released without modifying the contents of that location. Thereafter, the processing device retrieves the SSP for the user mode from the appropriate shadow stack register 1270 associated with that privilege level. Otherwise, the processing device may generate a fault indicating that the token 1330 is not valid.

In another example of a privilege level transition, the processing device may transition from a current supervisor mode privilege level to a new higher supervisor mode, such as a CPL2->CPL1, CPL1->CPL0 or CPL2->CPL0 mode transition. This type of privilege level transition may be initiated, for example, by a call through a call gate that requests a change a higher privilege level or by calling and interrupt/exception handler. On such a transition, the processing device selects the SSP 1320 for the new privilege level from the appropriate one of the shadow stack registers 1270 for that level. Once the processing device retrieves the SSP 1320 from the register associated the new privilege level, the processing device performs several checks to verify the SSP programed in the register.

In some embodiments, the processing device performs the checks by using verify and set busy logic 1325 as described above. If the checks are successful, the processing device marks the shadow stack 1310 as busy by setting the busy indicator in the token 1330. Then, the processing device pushes the CS 1340 selector (e.g., code segment selector) identifying the code segment in memory 1301 being executed, EIP 1350 identifying return address information and the SSP 1360 associated with the current privilege level onto the shadow stack of the new privilege level. In some embodiments, the processing device may push a linear instruction pointer (LIP) (which is the EIP plus the code segment base) on the shadow stack of the new privilege level instead of the EIP 1350. This may be done in order to detect any attempts to change the code segment base between a call and return from the call.

On a return to the previous supervisor mode from the new supervisor mode, the processing device ensures that such returns are to the same address where the previous call was made from. For example, the processing device verifies that the CS 1340 and EIP 1350 (or LIP) from the shadow stack 1310 matches corresponding values on the data stack 1303. If there is a match, then the processing device removes or pops the CS 1340, EIP 1350 and SSP 1360 off of the shadow stack 1310 to establish the new SSP used at the new privilege level. In some embodiments, the push and pop operations are done using specific shadow stack store and load operations, such that if the operations are to memory not marked as shadow stack memory in the page tables the operations cause a fault.

As part of the transition, the processing device as directed by the verify and clear busy logic 1335 checks whether the busy indicator in the token 1330 of the shadow stack pointed to SSP 1320 is set and whether the linear address recorded in the token 1330 matches the address of the SSP 1320. If all of the above checks results in a correct indication, then the processing device marks the token 1330 as "free" by clearing the busy indicator in the token 1330.

In yet another example of a privilege level transition may be based on a mode transition of the processing device from a user mode to a most trusted privilege level, such as CPL3->CPL0 mode transition. This type of privilege level transition may be initiated, for example, using a certain instruction like SYSCALL or SYSENTER that is designed to invoke system function calls where some of the system calls do not use the stack to perform the system call operations. In such a transition, the processing device save the current SSP in the register associated with the user mode and switches to the shadow stack associated with CPL0 privilege level by retrieving the SSP in the corresponding register. Since processing device may be performing a system critical operation it does not verify the SSP, but it still selects one of the shadow stacks among the set of the shadow stacks as the current SSP for the new privilege level. For example, this type of privilege level transition may be initiated, for example, by a fast system call that does not use the stack to perform the system call operations. In some embodiments, if the system call needs to use the stack to make calls then it may be configured to use a new instruction provided by the processing device to perform the verify and mark the shadow stack as busy, such as employed in the verify and set busy logic 1325. This operation of the verify and set busy logic 1325 is done on a shadow stack that is selected, but not previously verified and set busy.

On a return to the previous user mode from the most trusted privilege level, such as a CPL0->CPL3 mode transition, the processing device restores the user mode shadow stack by access the SSP stored in the register corresponding to the user mode privilege level. This type of privilege level transition may be initiated, for example, by system return or exit instructions (e.g., SYSRET or SYSEXIT). Prior to returning to CPL3, if the system call used the new instruction provided by the processing device to verify and mark the shadow stack as busy, a complementary instruction is provided by the processing device to verify and mark the shadow stack as free, such as employed in the verify and clear busy logic 1335.

Figure 14:
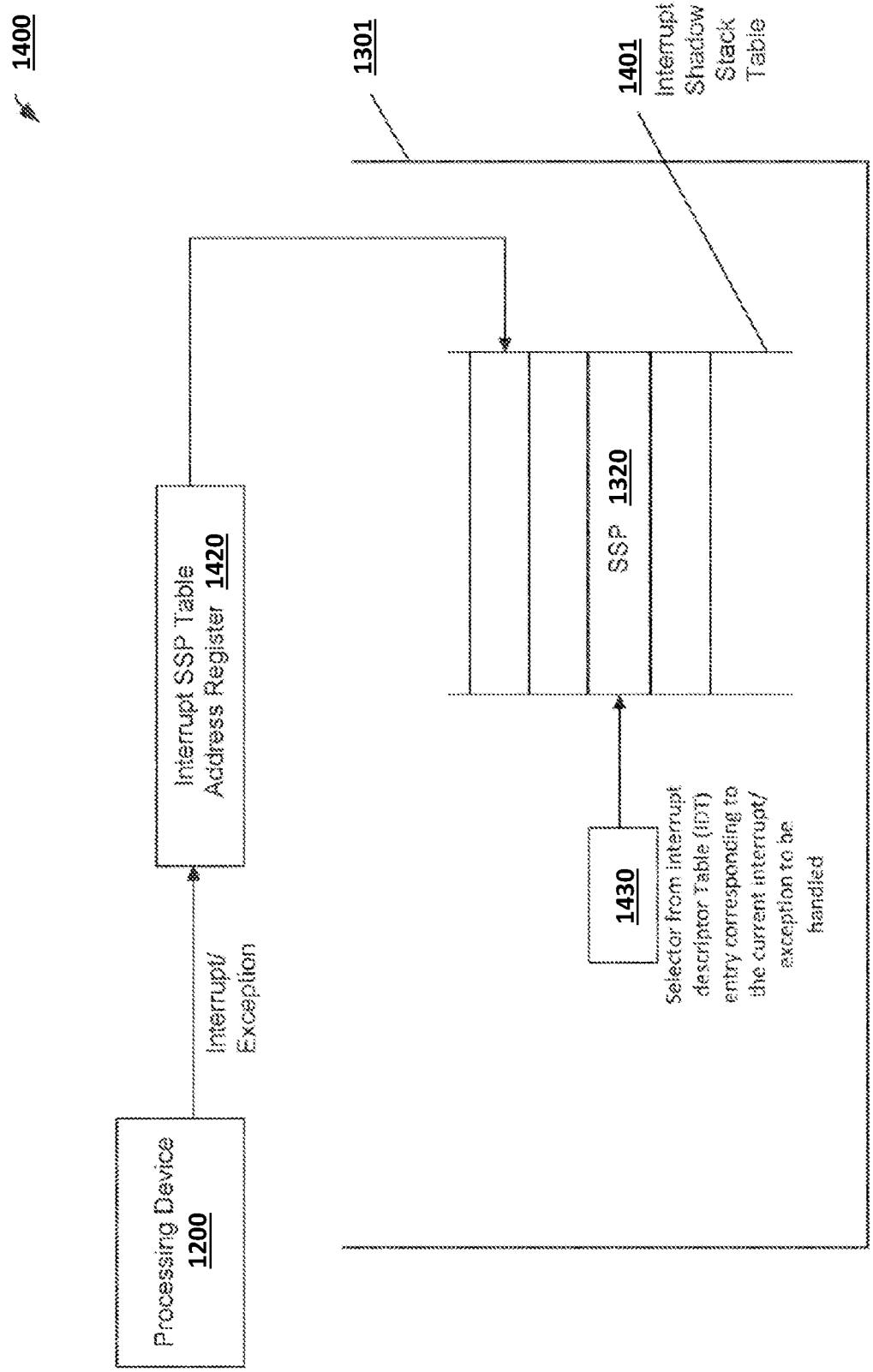
FIG. 14 illustrates one embodiment which processes SSPs based on interrupts.

FIG. 14 illustrates a system 1400 including the memory 1301 of FIG. 13 for switching stacks as part of an interrupt or exception delivery according to one embodiment. In some embodiments, the present disclosure provides techniques to complement a shadow stack switch during delivery of certain interrupts and execution by using an interrupt shadow stack pointer table 1410 instead of the shadow stack registers 1270 being used to select a shadow stack pointer for the privilege level at which this interrupt or exception handler is to be executed. System software of the processing device 1210 may program the address of the table 1410 into a register, such as interrupt SSP table address register 1420. The table 1410 is used to store the SSP 1320 that is identified by the processing device during a ring transition as described above with respect to system 1300 or to cause a stack switch even without a ring transition if the interrupt or exception was configured to operate on a new shadow stack. In this regard, the selection of the new shadow stack is from one of the shadow stack pointers in the Interrupt shadow stack table 1410 using a selector 1430 configured for that interrupt in a interrupt descriptor table (IDT).

In operation, when an exception or interrupt occurs, the processing device may respond with a control transfer to a certain code sequence intended to deal with such an event. This code sequence typically runs in supervisor mode. The address of this special code sequence, or routine, is retrieved by the processing device from an Interrupt Descriptor Table (IDT), using an index into the IDT that is specific to the type of exception that occurred (e.g., one index may correspond to a page fault while another corresponds to an overflow exception). This IDT entry may further have an index into the interrupt shadow stack table 1410, such that when this index value is non-zero it indicates that a shadow stack switch must be performed for that interrupt or exception even when there was no privilege change required to deliver the interrupt or exception. The processing device may use the index associated with the IDT to index the interrupt shadow stack pointer table 1410 to identify the entry storing the SSP 1320. For example, the entry in the interrupt shadow stack pointer table 1410 may also be specific to the type of exception that occurred. The SSP 1320 may be then used by the processing device at a new privilege level associated with the interrupt. Subsequent to selection of the SSP, the processor device invokes certain logic (e.g., Verify and Set Busy Logic 1325, to ensure that the SSP 1320 stored in the Interrupt Shadow Stack Table 1410 points to the top of valid shadow stack for that mode of operation and that the shadow stack is not busy.

Figure 15:
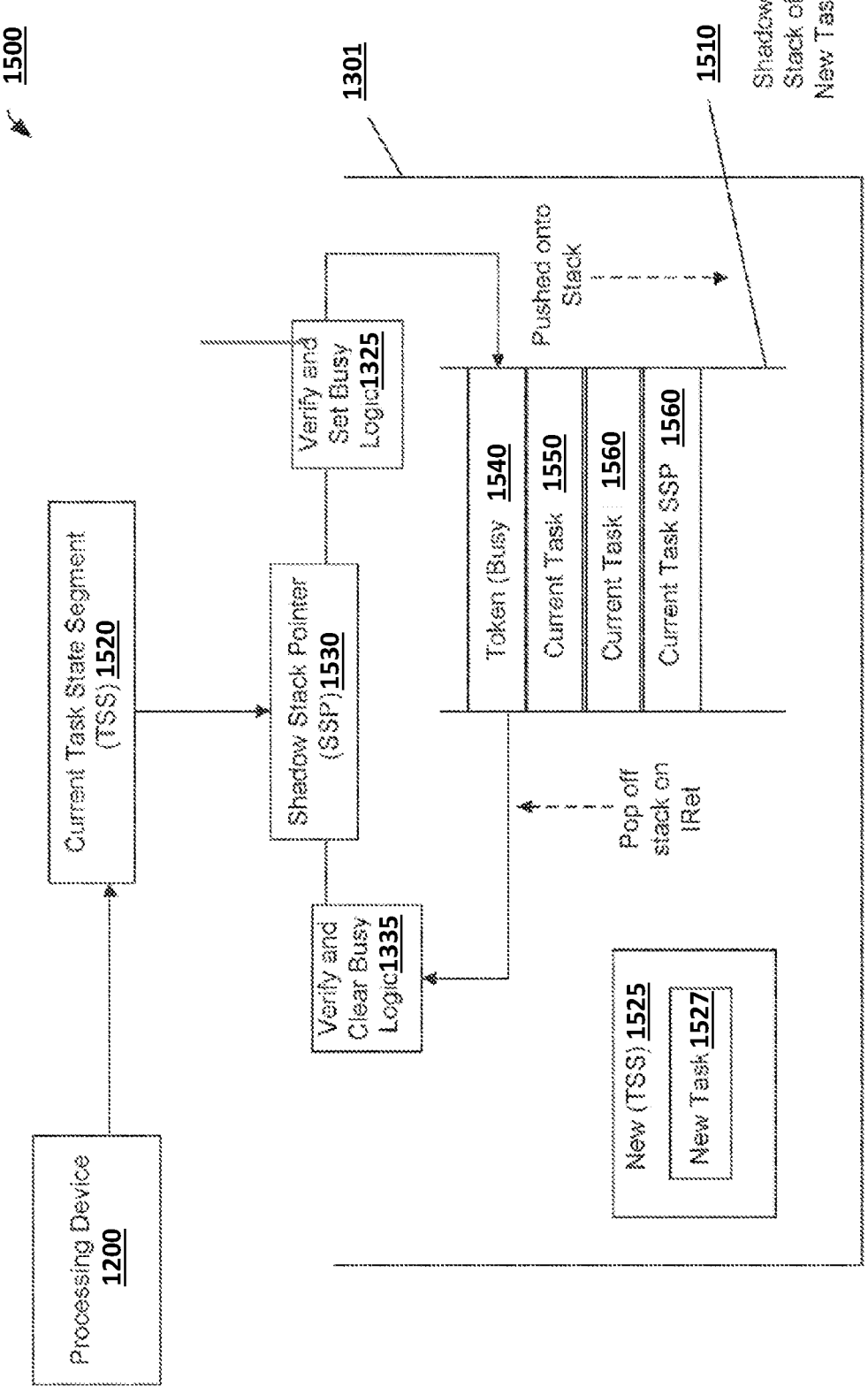
FIG. 15 illustrates additional details associated with shadow stack pointer management in accordance with one embodiment.

FIG. 15 illustrates a system 1500 including memory 1301 of FIG. 13 for switching stacks as part of task switching according to one embodiment. In a task switching operation, processing device may execute a control transfer instruction that causes a task switch from a current running task to a new task. In some embodiments, the tasks may represent units of work that the processing device can dispatch, execute or suspend. By way of example, the tasks may be used to execute one or more of a program, a task or process, an operating-system service utility, an interrupt or exception handler, or a kernel or executive utility. In one aspect, task switches may be performed when call procedure instructions are performed, or when interrupts or exceptions occur, or otherwise.

When the processing device preforms a task switch from a current task to a new task, the device saves state information of the current task in a data structure in memory 1301 referred to as a task state-segment (TSS), such as current TSS 1520, that corresponds to the current task, and state information of a new task 1527 may be loaded or retrieved from another TSS (e.g., New TSS 1525) that corresponds to the new task 1527. This state information may include, but not limited to, information required for performing task switches, such as stack and instruction pointers and an 1210 map base addresses.

The TSS represents a hardware managed data structure in memory on computers that may be used to store information about tasks. For example, the TSS includes information required for the processing device 100 to preform task switches, such as stack pointers. Each TSS for the different tasks may include stack pointers to different stacks (e.g., data stacks used to store both control information and data) for different privilege levels. The stack pointers are used to identify the appropriate stack when privilege level changes are made due to the task switching operation. For example, a task switch operation may include switching a current task at the current privilege level to a new task at a new privilege level.

In some embodiments, shadow stacks as described herein may be used to protect the data stacks during a privilege level transition from the current task to the new task. As noted above, the shadow stack is a second stack separate from the data stack that stores and protects information from the data stack used in control transfer operations. In one embodiment, shadow stack selection information, such as shadow stack pointer 1530, may be stored in the TSS structure in certain processor architectures (e.g., Intel core i7, i5, and Xeon processors).

Referring to FIG. 15, the processing device in operation responds to a task switch from a current task to a new task by identifying a TSS 1520 associated with the new task. In this regard, the task switch may be initiated, for example, by a call instruction, an interrupt/exception or otherwise. In some embodiments, the processing device retrieves an SSP 1530 stored in the TSS 1520. The SSP 1530 identifies a shadow stack 1510 to use with the new task.

In some embodiments, the processing device verifies SSP 1530 by preforming checks using verify and set busy logic 1325 as described above. If the checks are successful, the processing device marks the shadow stack 1310 as busy by setting the busy indicator in the token 1540. Then, the processing device pushes the CS 1550 pointer identifying the code segment of the current task being executed, EIP 1560 identifying return address information related to the current task and the SSP 1570 associated with the current privilege level of the current task onto the new shadow stack.

On a return from the new task to a previous task, the processing device ensures that such returns are to the same address of the previous task. For example, the processing device verifies that the CS 1550 and EIP 1560 from the shadow stack 1510 matches corresponding values in the TSS associated with the previous task. If there is a match, then the processing device removes or pops the CS 1550, EIP 1560 and SSP 1570 off of the shadow stack 1510 to establish the current SSP used in the previous task. As part of the return transition to the previous task, the processing device as directed by the verify and clear busy logic 1335 checks whether the busy indicator in the token 1540 is set and whether the linear address of the token 1540 matches the address of the SSP 1530. If all of the above checks results in a correct indication, then the processing device marks the token 1540 as "free" by clearing the busy indicator in the token 1540.

While certain architectures support operating at privilege level 1 or 2 (CPL==1 or CPL==2), these privilege rings are not used by some operating systems. Moreover, certain architectures do not support interrupt/exception delivery with handlers operating at privilege levels greater than 0. While the remainder of this detailed description focuses on interactions within privilege ring 0, the underlying principles of the invention are not limited to operation at any particular privilege level.

One embodiment of the processing device supports a fast return and event delivery (FRED) implementation which targets significantly speeding up the interrupt/exception delivery architecture for modern 64 bit operating systems. In particular, this embodiment replaces delivery through the interrupt descriptor table (IDT) thereby removing the memory accesses and descriptor table loads needed to locate the code and stack segments selector and pointers for the event handler. In addition, deprecation of event/exception delivery for rings 1 and 2 reduces latency as the event delivery microcode and/or circuitry does not need to consider these paths. Finally, one embodiment provides separate instructions for returning to the user space and the supervisor space, for an optimal microcode implementation with low latency.

In one embodiment, when multiple shadow stacks are used, only one shadow stack (the current shadow stack) is available at a given time. As described above, the pointer to the top of the current shadow stack is held in the shadow stack pointer (SSP) 1320. To support switching shadow stacks on privilege switches one embodiment of the processor includes the following model specific registers (MSRs):

1. IA32_PL3_SSP
2. IA32_FRED_SSP0
3. IA32_FRED_SSP1
4. IA32_FRED_SSP2
5. IA32_FRED_SSP3

In one embodiment, the IA32_PL3_SSP MSR holds the SSP value to be established when transitioning to CPL 3. The IA32_FRED_SSPi hold the SSP value to be established when transitioning to CPL 0 for interrupt and/or event delivery.

Figure 16:
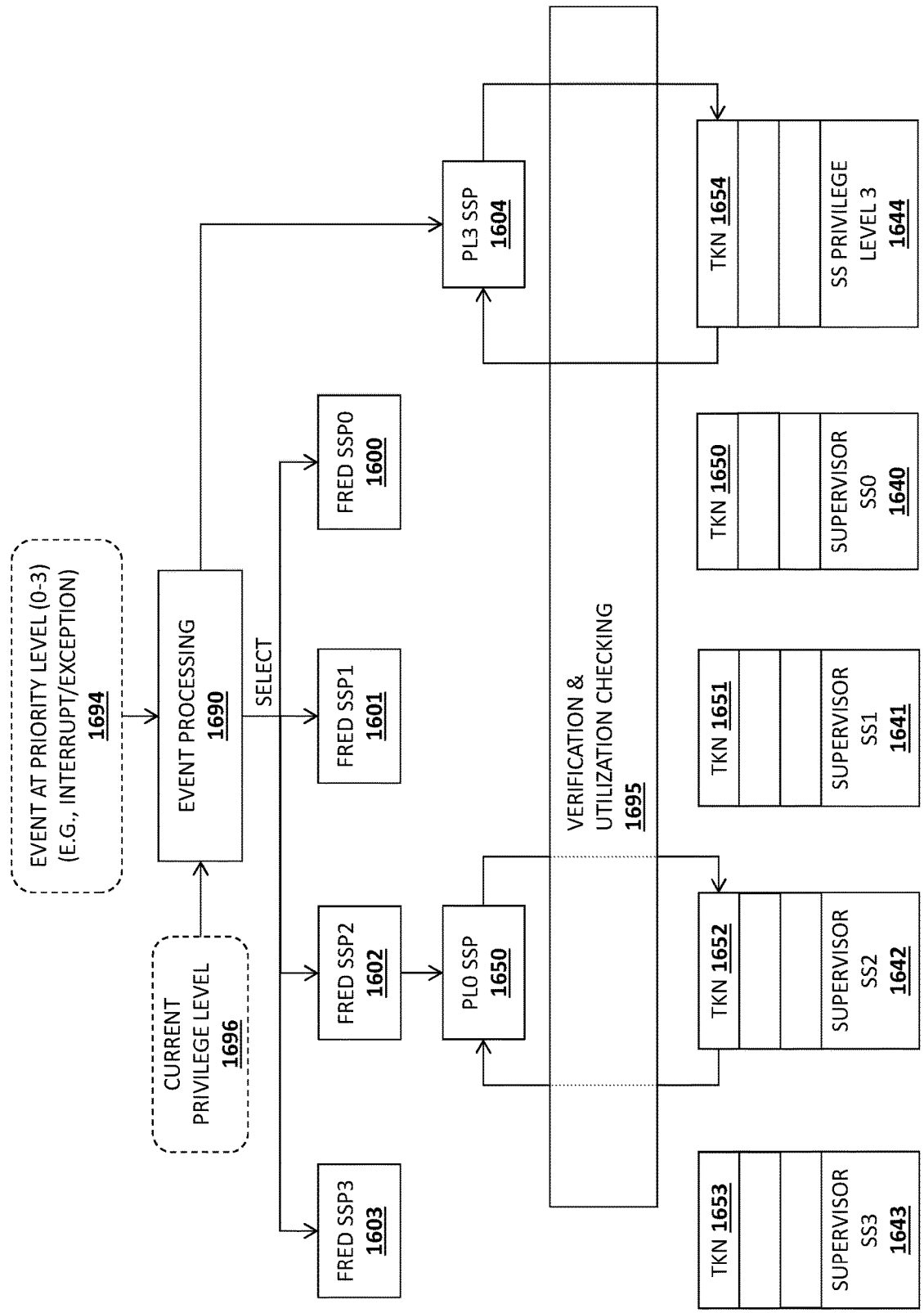
FIG. 16 illustrates an embodiment in which an SSP is selected and verified using atomic or non-atomic operations.

FIG. 16 illustrates an embodiment in which event processing circuitry/logic 1690 selects an SSP MSR 1600-1604 with a pointer to a shadow stack 1640-1644, respectively, based on the priority level of the interrupt/exception 1694 and the current privilege level 1696. In this embodiment, interrupts and exceptions 1694 are classified into one of four priority levels, 0 through 3, where 0 is the lowest priority and 3 is highest. When an event needs to be processed, the event processing circuitry/logic 1690 delivers it on the stack level configured for that level ('i') by switching the SSP to the value in the corresponding IA32_FRED_SSPi MSR. For example, in response to an interrupt or exception 1694 with a priority level of 2, the shadow stack pointer from the FRED SSP2 MSR 1602 is selected, identifying supervisor shadow stack SS2 1642 (depending on the current privilege level 1696 as described below). However, if the processor is already handling an event that is classified to be delivered at a higher stack level than the currently active stack level, then the processor stays on the current stack.

The remainder of this description will assume a switch to the shadow stack for stack level 'i' at which the event/interrupt needs to be delivered. In one embodiment, each of the FRED SSPi MSRs 1600-1603 store following bit field definitions:

Bit 0—Verified (V)—indicates whether the MSR points to a verified supervisor-shadow-stack token (described later)

Bit 2:1—Reserved (set to 0)

Bit 63:3—Linear address of a valid supervisor-shadow-stack token on a supervisor shadow stack.

In one embodiment, the event processing circuitry/logic 1690 selects a pointer from one of the SSP MSRs 1600-1603 which identifies a new supervisor shadow stack 1640-1643, respectively, if an event 1694 arrives when the processor is executing in user mode at CPL3 (i.e., as indicated by the current privilege level 1694) or if the processor is already executing in supervisor mode at CPL0 and the event 1694 needs to be delivered at a higher stack level. Thus, assuming shadow stacks are enabled at CPL3 (user mode) and CLP0 (supervisor mode), the SSP is saved to the PL3 SSP 1604 (i.e., when starting in user mode) and a shadow stack is established for supervisor mode using the SSP address in the selected FRED SSPi MSR 1600-1603 where i is the stack level being switched as identified by the priority of the event 1694 to be delivered.

Once the tentative SSP for supervisor mode has been selected as the PL0 SSP 1650 from one of the FRED SSPi MSRs 1600-1603, verification & utilization checking circuitry/logic 1695 confirms that (1) the SSP programmed in the selected SSP MSR 1600-1603 is pointing to the top of the corresponding supervisor shadow stack 1640-1643, respectively, and (2) the supervisor shadow stack 1640-1643 pointed to by this tentative SSP 1602 is not already active on any other logical processor, as indicated by the busy bit (B). If both checks are passed then the FRED SSPi MSR 1602 becomes the new privilege level 0 (PL0) SSP 1650.

These checks are performed to prevent a cross thread attack where an attacker may point the MSR on two logical processors to the same shadow stack and thus be able to manipulate the return addresses consumed on one logical processor by making calls on the second logical processor.

In one embodiment, to perform these checks, system software locates a supervisor-shadow-stack token 1650-1653 at the top of each supervisor shadow stack. In one particular implementation, the supervisor-shadow-stack token 1650-1653 is formatted as follows:

Bits 63:3—Linear Address of the token on the shadow stack

Bit 2:1—Reserved (set to 0)

Bit 0—Busy (B); if this bit is 0, the selected shadow stack 1640-1643 is not loaded on any logical processor.

Figure 17:
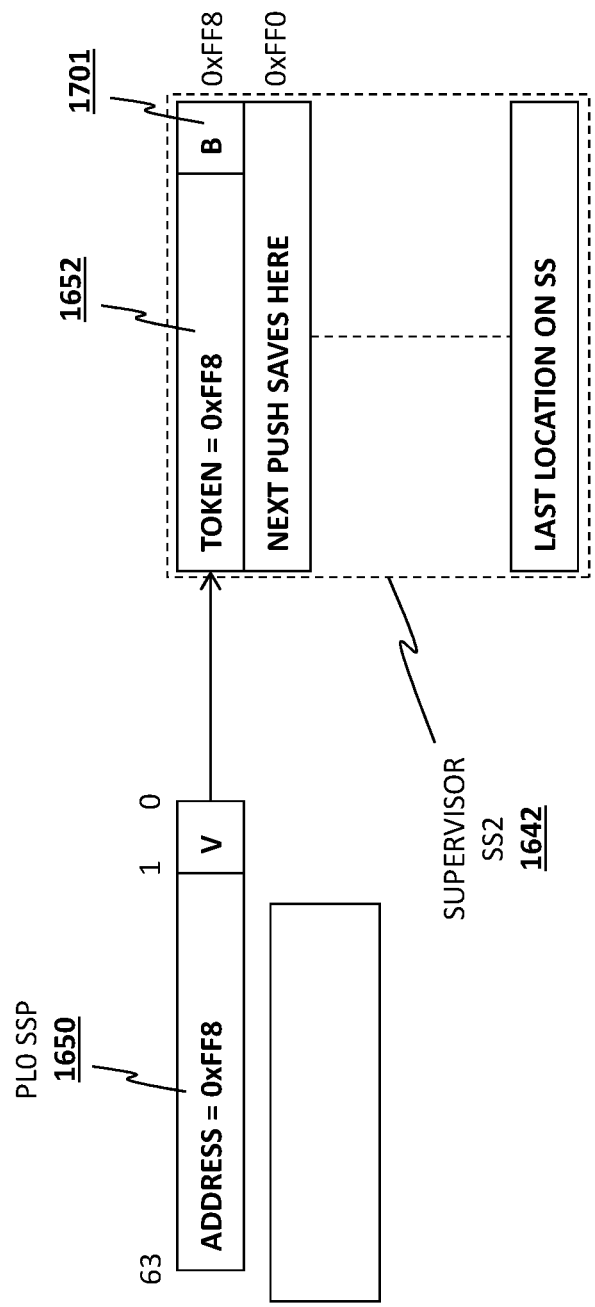
FIG. 17 illustrates one embodiment of a verification/validation operation.

FIG. 17 illustrates a supervisor shadow stack 1642 with a supervisor shadow stack token 1652. The PL0_SSP 1650 holds the linear address 0x1008 which points to the top of the supervisor shadow stack 1642 that holds the supervisor-shadow-stack-token 1652. When the system software creates this shadow stack the busy flag 1701—bit 0—is initialized to 0.

Figure 18:
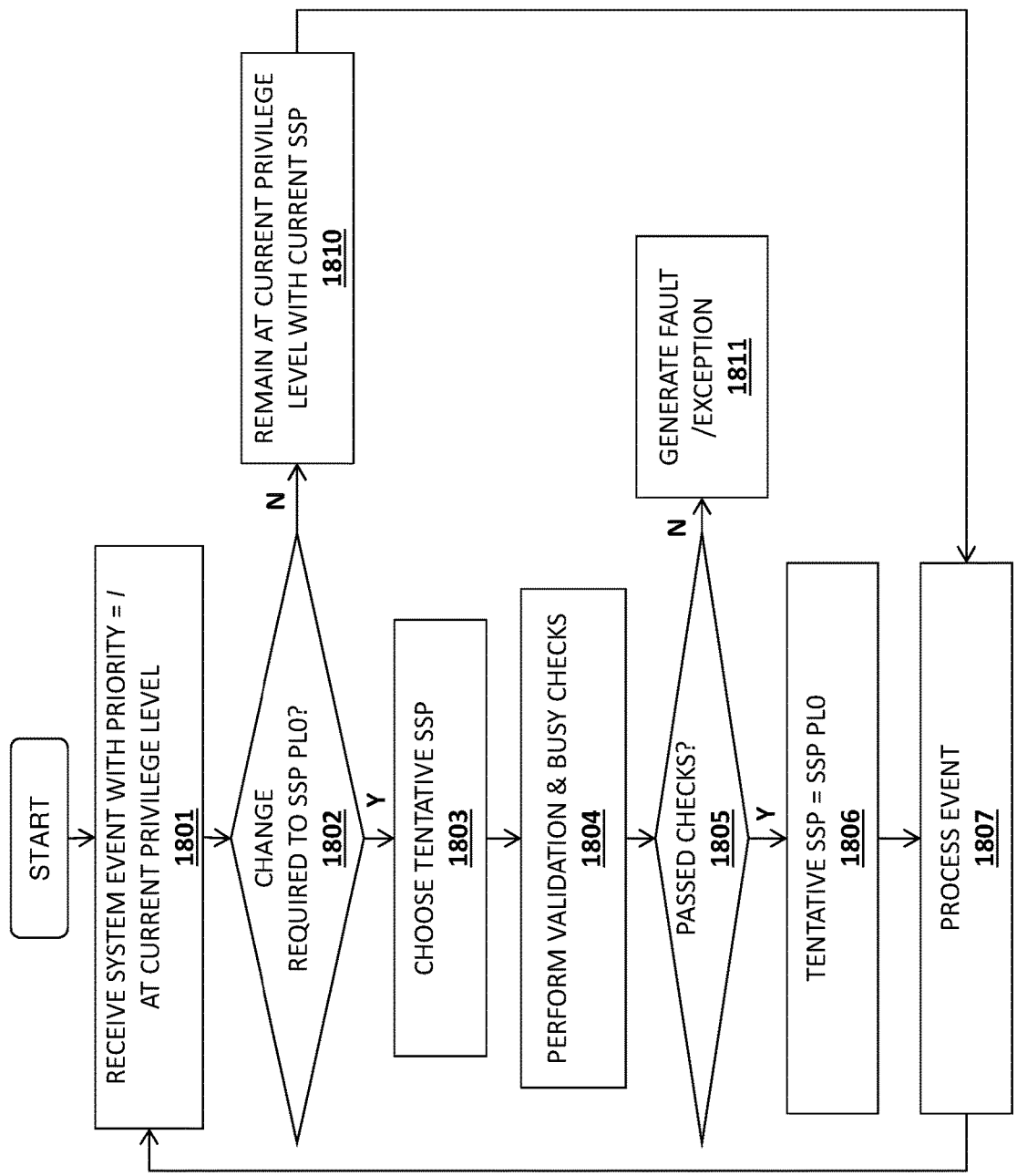
FIG. 18 illustrates a method in accordance with one embodiment of the invention.

A method in accordance with one embodiment of the invention is illustrated in FIG. 18. The method may be implemented on the processor and system architectures described herein, but is not limited to any particular architecture.

At 1801, a system event (e.g., an interrupt) is received at the current privilege level with a priority of i. At 1802 a determination is made as to whether a change is required to the privilege level 0 shadow stack pointer. As described above, a change is required if the event arrives when the processor is executing in user mode at CPL3 or if the processor is already executing in supervisor mode at CPL0 and the event needs to be delivered at a higher stack level. If no change is required, then the process remains at the current privilege level with the current SSP at 1810.

If a change is required, then at 1803, a tentative SSP is selected based on the priority (i) of the event. For example, the tentative SSP may be selected from SSP MSRi. At 1804 verification and busy checks are performed on the tentative SSP. For example, the token at the top of the shadow stack may be compared to the tentative SSP and the busy bit may be checked to confirm that the shadow stack identified by the tentative SSP is not loaded on any other logical processor. If either of these checks fail, determined at 1805, then a fault/exception is generated at 1811.

If both checks pass at 1805, then at 1806 the shadow stack pointer for privilege level 0 is set to the tentative SSP. The current privilege level may also change. At 1807 the event is processed at the current privilege level and using the new SSP PL0 value. The process then returns to 1801 as the next system event is received.

In one embodiment, the validation & utilization checking circuitry/logic 1695 and the validation & busy checks 1804 operate to ensure that if the MSR is marked as not verified then the shadow stack (e.g., FRED SSP2 1602) can be loaded only on one logical processor at any time ("Check 1" in code sequence below). In addition, these embodiments ensure that the shadow stack pointer in the MSR is pointing to a valid supervisor-shadow-stack token at the top of the stack ("Check 2" in the code sequence below).

In one embodiment, the following code sequence is executed to verify the token and set the shadow stack pointer SSP to the address in the token:

```
IF ShadowStackEnabled(CPL)
    tempSSP =FRED_SSPi; (* where i is the stack level *)
    tempSSP.B = 0
    If FRED_SSPi.V == 0
        // Verified bit not set
        Fault = 0
        Atomic Start
            SSPToken = 8 bytes loaded with shadow stack semantics from tempSSP
```

```
    // Check 1: IF BUSY BIT already set then cause a fault
    IF (SSPToken.B == 1) THEN fault <-1; FI;
        // Check 2: If the address in token does not match the tentative SSP then
        fault
    IF SSPToken != tempSSP) THEN fault <-1; FI;
            // If no fault detected then set the token to busy
        IF fault = 0 THEN SSPToken.B = 1; FI;
            Store 8 bytes of SSPToken with shadow stack semantics to SSP;
    Atomic End
    If fault = 1 THEN #GP(0); FI;
        // If any fault detected then cause a #GP exception
    FRED_SSPi.V = 1 // Set verified bit in MSR
ELSE
    // MSR has verified bit set; check if MSR address matches token
    SSPToken = 8 bytes loaded with shadow stack semantics from tempSSP
    // Check 1: IF BUSY BIT already set then cause a fault
    IF (SSPToken.B == 1) THEN fault <-1; FI;
    // Check 2: If the address in token does not match the tentative SSP then fault
    IF SSPToken != tempSSP) THEN fault <-1; FI;
    If fault = 1 THEN #GP(0); FI; // If any fault detected then cause a #GP exception
    ENDIF
    SSP = tempSSP
FI
```

Note that when the MSR is not marked as verified then these checks may be performed atomically using a locked read-modify-write as denoted by the Atomic-Start in the above code sequence which acquires the lock on the cache line and Atomic-End that releases the acquired lock. If these checks succeed the token is marked busy and the MSR is marked as verified.

In one embodiment, once the MSR is marked as verified then on subsequent invocations of these operations, no more locked read-modify-write operations are performed. Rather, if the MSR is already marked as verified, then the same two checks may be performed by loading the token from memory without acquiring a lock on the cache line holding the token. In one embodiment, in order to avoid the verified bit being set erroneously or maliciously in the MSR, the instructions that are used to write this MSR always ignore the verified bit (e.g., bit 0) in the written value and unconditionally clear the verified bit to 0. Such instructions include, but are not limited to, the WRMSR instruction (write model-specific MSR) and the XRSTORS instruction (restore processor supervisor-mode extended states from memory).

Figure 19:
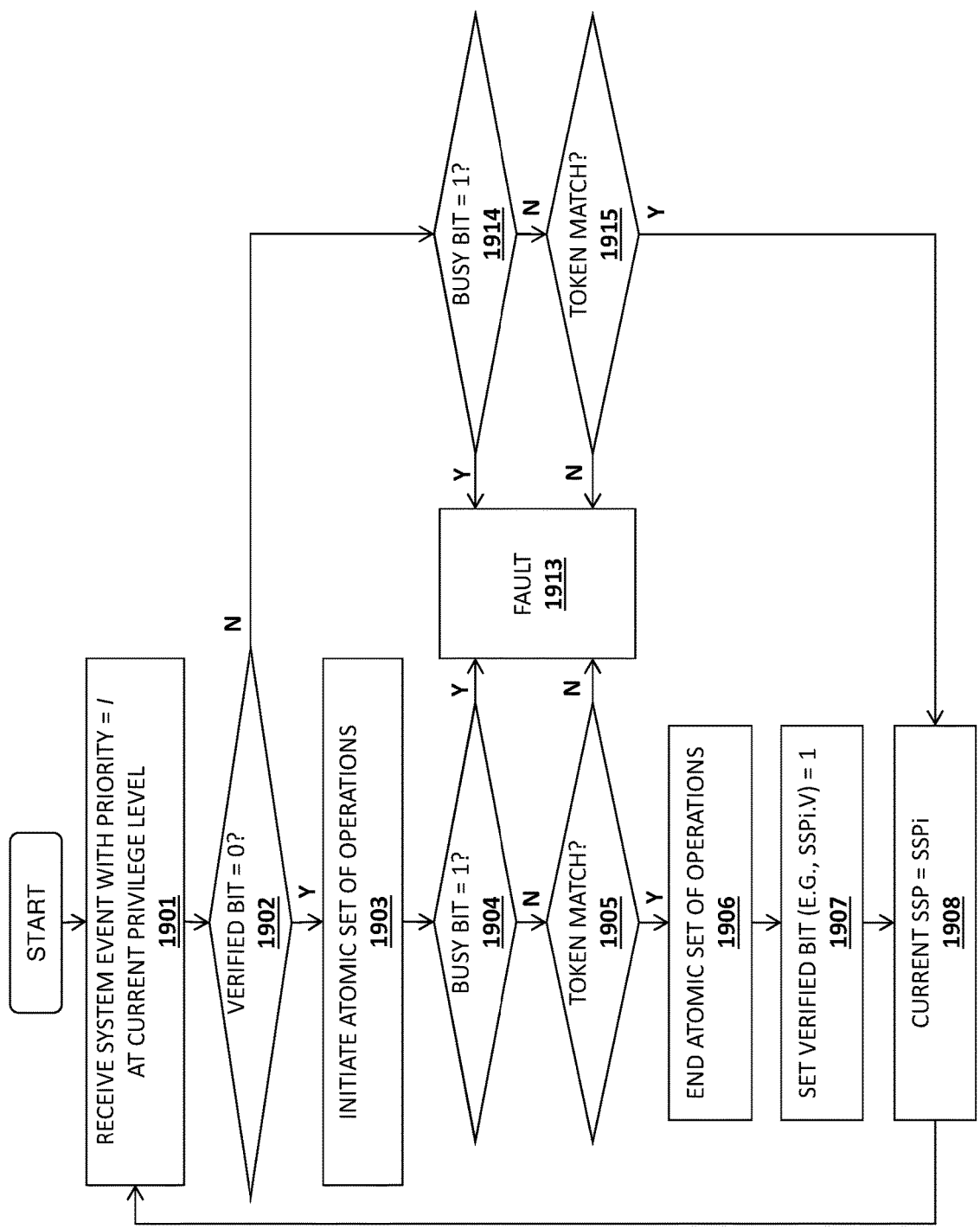
FIG. 19 illustrates additional details of a method for selecting between atomic and non-atomic verification and busy checking operations.

FIG. 19 illustrates one embodiment of a method for choosing between atomic operations and non-atomic operations based on the verified bit. At 1901 a system event such as an interrupt is received with a priority level of i. At 1902, a check is made to determine whether the verified bit (e.g., SSPi=0) is 0 (i.e., not verified). If the verified bit is 0, then at 1903 an atomic set of operations is initiated. The busy bit is checked at 1904. If it is set to 0, then at 1905 the shadow stack token is compared to the temporary SSP. If they match, then atomic operations are completed at 1906. At 1907 the verified bit is set to 1 and at 1908 the temporary shadow stack pointer (SSPi) is made the current shadow stack pointer (SSP).

Returning to 1904, if the busy bit is set to 1 (meaning the shadow stack is in use by another logical processor) or, at 1905, if the token does not match the temporary SSP, then a fault condition is generated at 1913. In addition, at 1902, if the verified bit is set to 1 (meaning that the SSP has already been verified), then the atomic set of operations are not required. The same two checks may be performed at 1914 (checking the busy bit) and at 1915 (comparing the token). However, these operations are performed without acquiring a lock on the cache line holding the required data. For example, no lock is acquired on the cache line storing the token, thereby improving performance by allowing other operations to proceed simultaneously.

The processor may switch away from a supervisor shadow stack (e.g., PL0 SSP 1650) when returning from handling of an interrupt/exception if the return is to user mode (CPL3) or when returning to the interrupted procedure in supervisor mode but the interrupted procedure was executing at a lower stack level than the stack level at which the event was handled.

The operating system as part of handling the event/interrupt may also perform a context switch. In one embodiment, the context switch causes a write to the FRED_SSPi MSRs to update the shadow stack pointers associated with one or more priority levels. In such a case, the writes to the FRED SSPi MSRs cause the verified bit in the MSR to be cleared to 0.

Thus, in one embodiment, three cases may occur on a return from an event handler:

(1) FRED_SSPi = SSP | 1:
- The SSP matches the MSR value (SSP is at stack bottom) and MSR is verified
- Do nothing
(2) FRED_SSPi = SSP
- SSP matches MSR value but MSR is not verified
- Check token to see if MSR can be re-verified:
(3) FRED_SSPi[63:1] ≠ SSP[63:1]
- SSP does not match MSR; reset token to make it free and clear MSR verification
- This operation requires an atomic read-modify-write as described above.
IF SSP == FRED_SSPi // where i is the current stack level
  // SSP matches the MSR value but verified bit in MSR is 0

```
// Attempt to re-verify the MSR - this reverification does not require any lock
// Check 1: First check if there is busy bit in the token
IF SSPToken.B = 0 (* If busy bit not set then invalid token*)
        invalidToken <-1; FI;
// Check 2: Verify address in token matches the SSP
IF ((SSPToken AND ~0x1) !=SSP)
        invalidToken <-1; FI;
// Valid token found; clear its busy bit
IF invalidToken = 0
    FRED_SSPi.V = 1
ELSE
  IF SSP != FRED_SSPi & ~0x01
    Atomic Start
    SSPToken <- Load 8 bytes with shadow stack semantics from SSP
    nvalidToken <- 0
  // Check 1: First check if there is busy bit in the token
    IF SSPToken.B = 0 (* If busy bit not set then invalid token*)
        invalidToken <- 1; FI;
    // Check 2: Verify address in token matches the SSP
    IF ((SSPToken AND ~0x7) !=SSP)
        invalidToken <- 1; FI;
    // Valid token found; clear its busy bit
    IF invalidToken = 0
        THEN SSPToken.B = 1;
    Store 8 bytes of SSPToken with shadow stack semantics to SSP;
    Atomic End
  ENDIF
ENDIF
```

Thus, when the MSR is pointing to a valid and busy supervisor shadow stack token, the MSR is marked as verified. This operation is the most frequent case and requires no locked operations—thereby improving performance. If the MSR is not pointing to a valid and busy supervisor shadow stack token on the current shadow stack, and if there is a busy supervisor shadow stack token on the current shadow stack then that token is made free. This operation is performed using a locked operation to ensure coherency and security.

Subsequent to clearing the token, if the processor is returning to user mode (CPL3) the processor establishes the shadow stack pointer for the user mode from PL3_SSP 1604. If the processor is returning to an interrupted procedure in supervisor mode (CPL0) then the shadow stack pointer of the interrupted procedure is restored (e.g., using the FRED SSP0 pointer).

Note that a WRMSR instruction or XRSTORS instruction that writes to the FRED_SSPi MSR causes the verified bit in that MSR to be cleared to 0. However a virtual machine manager (VMM) or Hypervisor needs to context switch the state of these MSRs on a virtual machine (VM) switch. In this embodiment, the VM context switch should not cause the verified state in these MSRs to be lost.

In one embodiment, to address this case when a VM exit occurs, the processor saves the FRED_SSPi MSRs—including the verified bit—to the virtual machine control structure (VMCS). One a subsequent VM entry, the processor restores the state of these MSRs, including the verified bit, from the VMCS.

EXAMPLES

The following are example implementations of different embodiments of the invention.

Example 1. A processor comprising: a plurality of registers to store a plurality of shadow stack pointers (SSPs), each SSP associated with a different event priority; event processing circuitry to select a first SSP of the plurality of SSPs from a first register of the plurality of registers responsive to receipt of a first event associated with a first event priority level, the first SSP usable to identify a top of a first shadow stack; verification and utilization checking circuitry to determine whether the first SSP has been previously verified, wherein if the first SSP has not been previously verified then initiating a set of atomic operations to verify the first SSP and confirm that the first SSP is not in use, the set of atomic operations using a locking operation to lock data until the set of atomic operations are complete, and wherein if the first SSP has been previously verified, then re-verifying the first SSP and confirming that the first SSP is not in use without using the locking operation.

Example 2. The processor of example 1 wherein the plurality of SSPs include a plurality of supervisor SSPs, including the first SSP, which are to point to a corresponding plurality of supervisor shadow stacks associated with supervisor privilege levels.

Example 3. The processor of example 2 wherein the plurality of SSPs further include at least one user-level SSP which is to point to a user-level shadow stack associated with a user privilege level.

Example 4. The processor of claim 1 wherein the first event comprises a first interrupt or a first exception associated with the first priority level.

Example 5. The processor of example 4 wherein the plurality of SSPs are to be associated with a corresponding plurality of event priority levels.

Example 6. The processor of example 1 wherein confirming that the first SSP is not in use comprises checking a value of a busy bit associated with the first SSP.

Example 7. The processor of example 6 wherein verifying and re-verifying the first SSP comprises comparing the first SSP to a first token value stored at the top of the first shadow stack.

Example 8. The processor of example 7 further comprising: execution circuitry to execute one or more instructions using a first data stack associated with the first shadow stack at a first supervisor privilege level associated with the first data stack.

Example 9. The processor of example 8 wherein the event processing circuitry and verification and utilization checking circuitry comprise portions of an instruction execution pipeline of the processor, the verification and utilization checking circuitry comprising a first portion of the instruction execution pipeline to execute a first set of instructions associated with SSP verification and utilization checking and the event processing circuitry comprising a second portion of the instruction execution pipeline to execute a second set of instructions associated with event processing.

Example 10. A method comprising: storing a plurality of shadow stack pointers (SSPs) in a corresponding plurality of registers, each SSP associated with a different event priority; selecting a first SSP of the plurality of SSPs from a first register of the plurality of registers responsive to receipt of a first event associated with a first event priority level, the first SSP usable to identify a top of a first shadow stack; determining whether the first SSP has been previously verified, wherein if the first SSP has not been previously verified then initiating a set of atomic operations to verify the first SSP and confirm that the first SSP is not in use, the set of atomic operations using a locking operation to lock data until the set of atomic operations are complete, and wherein if the first SSP has been previously verified, then re-verifying the first SSP and confirming that the first SSP is not in use without using the locking operation.

Example 11. The method of example 10 wherein the plurality of SSPs include a plurality of supervisor SSPs, including the first SSP, which are to point to a corresponding plurality of supervisor shadow stacks associated with supervisor privilege levels.

Example 12. The method of example 11 wherein the plurality of SSPs further include at least one user-level SSP which is to point to a user-level shadow stack associated with a user privilege level.

Example 13. The method of claim 10 wherein the first event comprises a first interrupt or a first exception associated with the first priority level.

Example 14. The method of example 13 wherein the plurality of SSPs are to be associated with a corresponding plurality of event priority levels.

Example 15. The method of claim 10 wherein confirming that the first SSP is not in use comprises checking a value of a busy bit associated with the first SSP.

Example 16. The method of example 15 wherein verifying and re-verifying the first SSP comprises comparing the first SSP to a first token value stored at the top of the first shadow stack.

Example 17. The method of example 16 further comprising: executing one or more instructions using a first data stack associated with the first shadow stack at a first supervisor privilege level associated with the first data stack.

Example 18. A machine-readable medium having program code stored thereon which, when executed by a machine, causes the machine to perform the operations of: storing a plurality of shadow stack pointers (SSPs) in a corresponding plurality of registers, each SSP associated with a different event priority; selecting a first SSP of the plurality of SSPs from a first register of the plurality of registers responsive to receipt of a first event associated with a first event priority level, the first SSP usable to identify a top of a first shadow stack; determining whether the first SSP has been previously verified, wherein if the first SSP has not been previously verified then initiating a set of atomic operations to verify the first SSP and confirm that the first SSP is not in use, the set of atomic operations using a locking operation to lock data until the set of atomic operations are complete, and wherein if the first SSP has been previously verified, then re-verifying the first SSP and confirming that the first SSP is not in use without using the locking operation.

Example 19. The machine-readable medium of example 18 wherein the plurality of SSPs include a plurality of supervisor SSPs, including the first SSP, which are to point to a corresponding plurality of supervisor shadow stacks associated with supervisor privilege levels.

Example 20. The machine-readable medium of example 19 wherein the plurality of SSPs further include at least one user-level SSP which is to point to a user-level shadow stack associated with a user privilege level.

Example 21. The machine-readable medium of example 18 wherein the first event comprises a first interrupt or a first exception associated with the first priority level.

Example 22. The machine-readable medium of example 21 wherein the plurality of SSPs are to be associated with a corresponding plurality of event priority levels.

Example 23. The machine-readable medium of example 18 wherein confirming that the first SSP is not in use comprises checking a value of a busy bit associated with the first SSP.

Example 24. The machine-readable medium of example 23 wherein verifying and re-verifying the first SSP comprises comparing the first SSP to a first token value stored at the top of the first shadow stack.

Example 25. The machine-readable medium of example 24 further comprising program code to cause the machine to perform the operations of: executing one or more instructions using a first data stack associated with the first shadow stack at a first supervisor privilege level associated with the first data stack.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a plurality of fast return and event delivery (FRED) shadow stack pointer (SSP) registers that store shadow stack pointers (SSPs); and
circuitry to, responsive to receipt of an event associated with an event level,
select a SSP from a FRED SSP register within the plurality of FRED SSP registers for the event level to check a shadow stack for a token,
determine whether the FRED SSP register has been verified,
when the FRED SSP register has not been verified,
read from an address specified by the SSP and lock the address read,
verify that a value read from the address specified by the SSP matches that of the shadow stack, and
upon verification, release the address and indicate the token as busy.

2. The processor of claim 1, wherein each of the plurality of FRED SSP registers is a model specific register.

3. The processor of claim 1, wherein determining whether the FRED SSP register has been verified is to check whether a single bit in the FRED SSP register is set, and it is determined that the FRED SSP register has been verified when the single bit is set.

4. The processor of claim 1, wherein reading from the address specified by the SSP comprises reading eight bytes from the address.

5. The processor of claim 1, wherein each of the plurality of FRED SSP registers comprises 64 bits, including bit 0 as a verified bit, one or more reserved bits, and bits 63:3 for SSP values.

6. The processor of claim 1, wherein indicating the token as busy comprises setting a single bit in the token.

7. The processor of claim 1, wherein when the FRED SSP register has been verified, the address specified by the SSP is read without the address being locked.

8. The processor of claim 1, wherein the plurality of FRED SSP registers comprises four FRED SSP registers, one FRED SSP register for each level of levels 0 to 3.

9. A method comprising:
responsive to receipt of an event associated with an event level, selecting a shadow stack pointer (SSP) from a fast return and event delivery (FRED) SSP register within a plurality of FRED SSP registers of a processor for the event level to check a shadow stack for a token;
determining whether the FRED SSP register has been verified; and
when the FRED SSP register has not been verified,
reading from an address specified by the SSP and locking the address read,
verifying that a value read from the address specified the SSP matches that of the shadow stack, and
upon verification, releasing the address and indicating the token as busy.

10. The method of claim 9, wherein each of the plurality of FRED SSP registers is a model specific register.

11. The method of claim 9, wherein determining whether the FRED SSP register has been verified is to check whether a single bit in the FRED SSP register is set, and it is determined that the FRED SSP register has been verified when the single bit is set.

12. The method of claim 9, wherein reading from the address specified by the SSP comprises reading eight bytes from the address.

13. The method of claim 9, wherein each of the plurality of FRED SSP registers comprises 64 bits, including bit 0 as a verified bit, one or more reserved bits, and bits 63:3 for SSP values.

14. The method of claim 9, wherein indicating the token as busy comprises setting a single bit in the token.

15. A non-transitory machine-readable medium having program code stored thereon which, when executed by a machine, is capable of causing the machine to perform:
responsive to receipt of an event associated with an event level, selecting a shadow stack pointer (SSP) from a fast return and event delivery (FRED) SSP register within a plurality of FRED SSP registers of a processor for the event level to check a shadow stack for a token;
determining whether the FRED SSP register has been verified; and
when the FRED SSP register has not been verified,
reading from an address specified by the SSP and locking the address read,
verifying that a value read from the address specified the SSP matches that of the shadow stack, and
upon verification, releasing the address and indicating the token as busy.

16. The non-transitory machine-readable medium of claim 15, wherein each of the plurality of FRED SSP registers is a model specific register.

17. The non-transitory machine-readable medium of claim 15, wherein determining whether the FRED SSP register has been verified is to check whether a single bit in the FRED SSP register is set, and it is determined that the FRED SSP register has been verified when the single bit is set.

18. The non-transitory machine-readable medium of claim 15, wherein reading from the address specified by the SSP comprises reading eight bytes from the address.

19. The non-transitory machine-readable medium of claim 15, wherein a FRED SSP register comprises 64 bits, including bit 0 as a verified bit, one or more reserved bits, and bits 63:3 for SSP values.

20. The non-transitory machine-readable medium of claim 15, wherein the plurality of FRED SSP registers comprises four FRED SSP registers, one FRED SSP register for each level of levels 0 to 3.

* * * * *